(12) United States Patent
Suau et al.

(10) Patent No.: US 7,345,121 B2
(45) Date of Patent: Mar. 18, 2008

(54) METHOD OF CONTROLLED FREE RADICAL POLYMERISATION OF ACRYLIC ACID AND ITS SALTS THEREOF, RESULTING LOW-POLYDISPERSITY POLYMERS, AND THEIR USES

(75) Inventors: Jean-Marc Suau, Lucenay (FR); Jean-Bernard Egraz, Ecully (FR); Jerome Claverie, Durham, NH (US); Catherine Ladaviere, Sainte Foy les Lyon (FR)

(73) Assignee: Coatex S.A.S., Genay (FR)

( * ) Notice: Subject to any disclaimer, the term of this patent is extended or adjusted under 35 U.S.C. 154(b) by 314 days.

(21) Appl. No.: 10/468,398

(22) PCT Filed: Feb. 28, 2002

(86) PCT No.: PCT/FR02/00722

§ 371 (c)(1),
(2), (4) Date: Dec. 31, 2003

(87) PCT Pub. No.: WO02/070571

PCT Pub. Date: Sep. 12, 2002

(65) Prior Publication Data

US 2004/0097674 A1    May 20, 2004

(30) Foreign Application Priority Data

Mar. 2, 2001   (FR) .................................. 01 02848

(51) Int. Cl.
*C08F 220/06* (2006.01)
*C08F 220/46* (2006.01)

(52) U.S. Cl. .................. 526/222; 526/317.1; 526/234; 522/180

(58) Field of Classification Search ............... 526/222, 526/317.1, 234; 522/184, 180
See application file for complete search history.

(56) References Cited

U.S. PATENT DOCUMENTS 4,842,651 A * 6/1989 Ravet et al. ............... 106/487
2004/0097674 A1 5/2004 Suau et al.

FOREIGN PATENT DOCUMENTS

| FR | 2 794 463 | 12/2000 |
|----|-----------|---------|
| WO | 98 01478 | 1/1998 |
| WO | WO 9931144 A1 * | 6/1999 |

OTHER PUBLICATIONS

U.S. Appl. No. 10/594,519, filed Sep. 28, 2006, Suau et al.
U.S. Appl. No. 10/594,520, filed Sep. 28, 2006, Suau et al.

* cited by examiner

*Primary Examiner*—Randy Gulakowski
*Assistant Examiner*—M. Bernshteyn
(74) *Attorney, Agent, or Firm*—Oblon, Spivak, McClelland, Maier & Neustadt, P.C.

(57) ABSTRACT

The present invention relates to the technical sector of the polymerisation of acrylic acid and its salts, more particularly in solution, more particularly by controlled radical method, the use of the corresponding organo-sulphurated transfer agents, the acrylic acid polymers thus obtained, having a very low polydispersity PD (or very low polymolecularity index IP, which is an equivalent term), and their applications in industry.

24 Claims, 10 Drawing Sheets

METHOD OF CONTROLLED FREE RADICAL POLYMERISATION OF ACRYLIC ACID AND ITS SALTS THEREOF, RESULTING LOW-POLYDISPERSITY POLYMERS, AND THEIR USES

TECHNICAL SECTOR OF THE INVENTION

The present invention relates to the technical sector of the polymerisation of acrylic acid and its salts, particularly in solution, particularly by a controlled radical method, the use of the corresponding organo-sulphurated transfer agents, the acrylic acid polymers thus obtained, having a very low polydispersity PD (or very low polymolecularity index IP, which is an equivalent term), and their applications in industry.

Technical Problem Posed

The main technical problem is aimed at reducing the polydispersity of the acrylic acid polymers and salts thereof.

A related problem lies in the obtaining of a sufficient conversion rate at the end of polymerisation, of the order of at least 90%, and preferably more than 95%.

Another related problem lies in the obligation to seek, for industrial applications, transfer agent molecules which are relatively simple and relatively simple to use, at a cost which is acceptable in industry.

Polymerisation in a solvent system has been favoured, which also poses problems of environmental protection, and it is also wished for the (co)polymer obtained to have a residual quantity of transfer agent or agents which is as low as possible.

This is why, preferentially, the solvent system of the polymerisation is an aqueous or water-alcohol system, the alcohols in question having one to four carbon atoms inclusive, and being able to be primary, secondary or tertiary, preferably primary or secondary.

As skilled man in the art will understand, these objectives are difficult to achieve, particularly together.

The above problems are aggravated by the fact that acrylic acid and its salts are monomers which are well known to polymerise very rapidly (very rapid kinetics). This kinetics is very sensitive to many parameters such as notably variation in pH, the choice of the solvent or solvents or variation in temperature. All these parameters mean that the polymerisation of acrylic acid is difficult to control.

There are many ways of defining control in polymerisation (see for example the discussions in Quirk, R. P.; Lee, B. Polym. Int. 1992, 27,359 or Penczek, S.,; Kubisa, P.; Szymanski, R. Makromol. Chem,; Rapid Commun. 1991, 12,77. and "Living Polymerization: Rationale for Uniform Technology", J. Pol. Sci., A: Pol. Chem, 38, 1706-1752,2000).

Control Means:
a) A reaction in which the polymer is formed in the absence of gel, even when the degree of progress of the reaction is close to 100% (greater than 90%). Because of its very great reactivity, the polymerisation of acrylic acid is generally accompanied by reactions involving transfer to the polymer, which are for example described in "The Chemistry of Free Radical Polymerization", Moad, G., Solomon, D. H., Pergamon, 1995. The combined presence of transfer reactions and bimolecular coupling reactions, inherent in radical polymerisation, gives rise to three-dimensional lattices of acrylic polyacid. These three-dimensional lattices are the constituents of the gel, which form spontaneously during the radical polymerisation of acrylic acid, which has the consequence of creating gels during the radical polymerisation of acrylic acid, whatever the required molecular weight. This cross-linking density can easily be characterised by the number of branches for 1000 carbons. This number of branches is directly related to the ratio of the speed of transfer reaction to the polymer to the speed of propagation reaction (see for example Flory, P. J. Principles of Polymer Chemistry; Cornell University Press: New York, 1953). This ratio is not affected by the use of the control method which is described here, and therefore the number of branches is identical between a conventional radical polymerisation and a polymerisation as described below. Nevertheless the use of the control method makes it possible to generate acrylic polyacid with a low molecular mass at high conversion rates. Consequently the number of polymer chains liable to grow is much greater with the controlled method than in conventional polymerisation. Therefore, in the controlled method, the number of branches is not sufficiently large to link all the chains together: the percolation threshold is not reached, and there is no formation of gel. The absence of gel is a necessary condition for being able to state whether the reaction is controlled.

b) A reaction whose "true" experimental polymolecularity index (or polydispersity PD) (IPv) is less than 1.5 or whose experimental polymolecularity index (=PD) $IP_{exp}$ is less than 2, when the degree of progress of the reaction is close to 1 (greater than 90%). In a radical polymerisation, it is known to skilled man in the art that the total distribution of the molar masses is the function which links the molar fraction of the chains of a given molar mass to the molar mass of these chains. This distribution is characterised by an arithmetic mean, called the mean molar mass in number ($M_n$) and a mean molar mass in weight ($M_w$), which corresponds to the second moment of the distribution. The ratio of the molar masses $M_w$ to $M_n$ is defined as the "true" polymolecularity index, $IP_v$, and gives an idea of the spread of the distribution. If all the chains in the distribution have exactly the same molar mass, then $IP_v$ will reach its lower value: 1. A non-controlled radical polymerisation has an $IP_v$ which is necessarily greater than 1.5, and therefore any $IP_v$ less than 1.5 is an irrefutable sign that the polymerisation is controlled. The converse is not true. Skilled man in the art assess the values of $M_n$ and $IP_v$ by means of steric exclusion chromatography (SEC). The experimental values which are extracted therefrom ($M_{nexp}$ and $IP_{exp}$) depend on the operating conditions which were used to effect the analysis. In particular, the values $M_{nexp}$ and $IP_{exp}$ depend on the following parameters:

Choice of the instrument, of the separating columns and detector or detectors and the working temperature.

Choice of the eluant. For analysing acrylic acid polymers, the choice of the eluant is crucial, since the polymer is more or less ionised according to the pH and the buffers contained in the eluant.

Choice of the calibration standards of the apparatus, and the calibration method.

Absence and/or presence of purification and/or of a chemical and/or physical process of modification of the polymer. For example, it is known to skilled man in the art (U.S. Pat. No. 5,242,594; EP 0 717 051) that a precipitation of the polymer followed by dissolution in the eluant before analysis by steric exclusion chromatography is often accompanied by a shrinkage of IPexp in the case of a polyacrylic acid and its salts.

Choice of the base line and the limits of integration of the polymer peak.

In conclusion, the values of $IP_{exp}$ can provide only an indication of the value of $IP_v$ and can under no circumstances provide an exact value. Moreover, these values are dependent on the precise experimental conditions used to determine them. Consequently it is recognised by skilled man in the art that, for distributions 1, 2, ..., i, ... n, with IPv values obeying a classification $IP_{v1}<IP_{v2}<IP_{vi}<...IP_{vn}$, then the experimental analysis will give $IP_{exp1}<IP_{exp2}<...IP_{expi}<...IP_{expn}$ and vice-versa provided that all these values are measured under similar experimental conditions. For a reaction to be controlled, it is therefore sufficient to have $IP_v<1.5$. As there exists no exact means of determining $IP_v$, we will use as a definition that a reaction is controlled if $IP_{exp}$, determined under the experimental conditions strictly described below, is smaller than 2.

In order to determine $IP_{exp}$, we used the following method, called IP method:

1 ml of the alkaline polymerisation solution was put on a dish, and was then evaporated at room temperature under a vacuum below 1 mm of mercury. The solute was taken up by 1 ml of the eluant of the SEC, and the whole was then injected into the SEC apparatus. The eluant of the SEC was a solution of $NaHCO_3$: 0.05 mol/l, $NaNO_3$: 0.1 mol/l, triethylamine: 0.02 mol/l, $NaN_3$ 0.03% by weight. The SEC chain contained an isocratic pump (Waters 515) whose output was adjusted to 0.5 ml/min, an oven containing a precolumn of the "Guard Column Ultrahydrogel Waters™" type, a linear column of the "Ultrahydrogel Waters™" type, 30 cm long and 7.8 mm inside diameter, and a refractometric detector of the RI Waters™ 410 type. The oven was raised to a temperature of 60° C., and the refractometer was raised to a temperature of 50° C. The chromatogram detection and processing software was the SECential software, supplied by "L.M.O.P.S CNRS, Chemin du Canal, Vernaison, 69277". The SEC was calibrated with a series of 5 sodium polyacrylate standards supplied by Polymer Standard Service, with references PAA 18K, PAA 8K, PAA 5K, PAA 4K, PAA 3K.

In addition, it is often established that control means the following additional criteria:

c) A reaction in which the molar masses in number increase in a strictly monotonic fashion as the reaction progresses. In a polymerisation, the mean degree of polymerisation $X_n$, is defined simply as the arithmetic mean of the number of monomers per polymer chain. It is then possible to obtain the mean molar mass in number, $M_n$, that is to say the mean degree of polymerisation multiplied by the molar mass of the monomer.

In general terms, two types of macromolecular reaction can be defined, namely polycondensation—which does not allow synthesis of the polyacrylic acid—and polymerisation. A polymerisation consists of a certain number of different processes such as initiation, propagation and termination (typically by dismutation, recombination or transfer). Where the termination is not the product of recombination (or other bimolecular processes for the active species), it has been shown (see for example: Odian, G. Principles of Polymerization; John Wiley & Sons, Inc.: New York, 1991; Gregg, R. A.; Mayo, F. R. J. Am. Chem. Soc. 1948, 70,2373; Mayo, F. R. J. Am. Chem. Soc. 1943, 65,2324; Brown, W. B.; Szwarc, M Trans. Faraday Soc. 1958,54,416. Shulz, G. V. Z. Physik. Chem. 1939, B43,25) that the mean degree of polymerisation at a given moment and the polymolecularity index are given by:

$$X_n = \frac{1}{1-p} \qquad (1)$$

$$IP_v = 1+p \qquad (2)$$

where p is the ratio of the speed of propagation to the sum of the speeds of each step in the mechanism in chains. For polycondensation, formulae (1) and (2) are still valid, but p is more simply the degree of advancement of the reaction. Polymerisation and polycondensation do not make it possible to obtain the same control of the mean degree of polymerisation $X_n$ according to the advancement of the reaction. For polymerisation, $X_n$ is more or less constant as from the low degrees of advancement of the reaction, whilst for polycondensation there is a dramatic increase in $X_n$ only as from very high degrees of advancement. Polymerisation of acrylic acid is recognised by skilled man in the art as forming part of the class of radical polymerisation reactions, and therefore it is expected that the mean degree of polymerisation does not vary with the degree of advancement (conversion). In practice, in the polymerisation of acrylic acid, insoluble gels often form (as described above), which complicates the analysis of the mean degrees of polymerisation.

If there are no termination or transfer steps, the polymerisation is then living. In this case, it has been shown that the mean degree of polymerisation is the quotient of the number of polymers consumed by the number of initiators consumed (see for example Flory, P. J. J. Am. Chem. Soc. 1940 62, 1561). Where the kinetic constants of propagation ($k_p$) and initiation ($k_i$) are equal, Flory demonstrated the equations linking $X_n$ and the $IP_v$ with the advancement of the reaction:

$$IP_v = 1 + \frac{v}{(v+1)^2} \qquad (3)$$

$$X_n = \frac{[MON]\_[M]}{[INIT]} \qquad (4)$$

where v is the degree of advancement, and [MON] and [INIT] are respectively the initial concentrations of the monomer and of the initiator, and [M] the concentration of the monomer at time t in question. The behaviour of $IP_v$ is remarkable: after a rapid increase of $IP_v$ up to 1.2 at a low degree of advancement, its value decreases asymptotically towards 1, at a high degree of advancement. When the initiation and propagation constants are different, Gold showed that it is possible to write $X_n$ and the $IP_v$ according to the degree of advancement in a non-trivial fashion (see Gold, L. J. Chem, Phys. 1958, 28,91). In this case, it is necessary to replace INIT, which is an initial concentration, with the fraction of the initiator which reacted at time t in question. The $IP_v$ varies qualitatively in an identical fashion, however the asymptotic decrease is slower, and the final value is higher. The molar mass increases with the degree of advancement, that is to say here the conversion, but the variation is no longer linear.

FIG. 1 shows variation in $M_n$ with the degree of advancement for a living polymerisation according to Gold (J. Chem. Phys. 1958, 28, 91) where the initiation speed is equal to the propagation rate (triangles) and for a polymerisation where the initiation speed is one ten thousandths times slower than the propagation speed (diamonds). The values used for this diagram are: [MON]=5 mol/l, [initiator]= 0.01 mol/l, $k_p$=100 l/mol/s, $k_i$=0.01 l/mol/s (diamonds) or $k_i$=100 l/mol/s (triangles). When $k_p$=$k_i$=100 l/mol/s, the degree of advancement at the end of 30 minutes is 100%, and the $IP_v$ is 1.0025 whilst in the case where $k_p$=100 l/mol/s and $k_i$=0.01 l/mol/s, $IP_v$ is 1.219 and the degree of advancement is also 100%.

The theoretical model of the living polymerisation indicates that, when the initiation speed is not as fast as the propagation speed, the molar mass increases monotonically but non-linearly with the degree of advancement. In the polymerisation of acrylic acid, where the value of $k_p$ is very great and not constant with the conversion (V. A. Kabanov, I. A. Topchiev, T. M. Karaputadze, J.Polymer Sci.: Symposium N° 42, 173-183, 1973 and Kuchta F. D., Van Herk A. L. V., German A. N., Macromolecules 2000, 33, 3641), it often happens that the initiation is slower than the propagation. Therefore a necessary but non-sufficient condition for the polymerisation to be controlled is that the molar mass of the polymer changes increasingly and monotonically with the degree of advancement. When the polymerisation is very rapid, which is the case in radical polymerisation of acrylic acid, sampling the reaction proves to be too difficult. This control criterion cannot then be verified experimentally. It will easily be understood that, when two experiments are conducted quantitatively with different quantities of monomer, all other parameters being otherwise identical, the molar masses of the polymers resulting from these experiments are conceptually identical to those which would have been obtained in one and the same experiment with different conversions (with a continuous addition of acrylic acid for example). The above criterion can therefore be replaced with an equivalent criterion: the molar mass of the final polymer (obtained with a conversion greater than 90%) increases strictly monotonically when the ratio of the concentrations of the transfer agent to monomer decreases.

d) A reaction in which the quantity of transfer agent is limited. More precisely, the transfer agent quantity limits are fixed so that the molar ratio of transfer agent to monomer is between 0.001% and 20% and the ratio by weight of transfer agent to monomer is between 0.01% and 50%, more particularly between 0.01% and 10% and even more particularly between 0.01% and 5%. In conventional radical polymerisation of acrylic acid, a transfer agent can be introduced in order to limit the molar masses of the polymer. For example, Cellard et al. determined (Makromol. Chem. 1935, 1982) an n-dodecanethiol-1 transfer constant of around 2 at 45° C. In this case, in order to obtain molar masses $M_n$ of around 1600 g/mol, the quantities [acrylic acid]: [CTA] are in a molar ratio of 8.4:1, [CTA] meaning the quantity of transfer agent in moles per litre. From a more general point of view, in order to obtain polymers with a low molecular mass $M_n$, it is necessary to add a large quantity of transfer agent. In the contrary case, the $IP_V$ will be greater than 2. This is because it has been demonstrated that, for a conversion polymerisation p, and a transfer constant $C_{tr}$ (see for example E. Ranucci, F. Bignotti, End-Functionalized Oligomers by Chain Transfer Technique in Polymeric Materials Encyclopedia, J. D. Salamone, 1996, Version 1.1) then, $$X_n = \frac{[MON]}{[CTA]} \times \frac{p}{1-(1-p)^{C_{tr}}} \quad (5)$$

$$IP_v = \frac{2}{C_{tr}(2-C_{tr})} \times \frac{(1-(1-p)^{C_{tr}})(1-(1-p)^{2-C_{tr}})}{p^2} \rightarrow si.C_{tr} \neq 2 \quad (6)$$

where [MON] and [CTA] are the initial quantities of monomer and transfer agent in moles per litre. Since each polymer chain consumes one transfer agent, the conversion into transfer agent is given directly by [MON]/[CTA]($p/X_n$).

FIG. 2 shows Mn (squares) and IPv (circles) at 90% conversion into monomer as a function of the transfer constant for a polymer in the presence of transfer agent in the case where [MON]=5 mol/l, [CTA]=0.1 mol/l.

FIG. 2 gives a graphical representation of equations 5 and 6. Obviously, when the transfer constant is small (<1), the molar mass of the polymer is great and therefore little transfer agent is consumed. In this case, a large quantity of transfer agent is necessary for the molar mass to decrease: the fourth control criterion is not satisfied. In addition, the conversion into transfer agent is low. When the transfer constant is large (>1), the molar mass is appreciably smaller, and all the transfer agent is rapidly consumed.

Therefore non-transferred polymer chains, with very high molar mass, are created at the end of polymerisation. The $IP_V$ then increases greatly and the second control criterion is not satisfied.

In summary, the Applicant means scientifically by "controlled", a reaction where the following two conditions are simultaneously fulfilled:

a) the polymer is formed in the absence of gel, even when the degree of advancement of the reaction is close to 100% (greater than 90%), b) the true polymolecularity index ($IP_v$) (=PD true) is less than 1.5 (or where the experimental polymolecularity index IPexp is less than 2), and, where the additional two conditions are preferentially fulfilled c) the molar masses in number increase strictly monotonically when the advancement of the reaction increases, d) the quantity of transfer agent is within limits which will for example in the case in question be 0.001% to 20% (molar) and 0.01% to 50% (weight), more particularly between 0.01% and 10% and even more particularly between 0.01% and 5%.

The radical polymerisation of the acrylic acid in a water-alcohol medium, when it is effected under conventional radical polymerisation conditions as known to skilled man in the art, is characterised by an extremely rapid polymerisation rate: the polymerisations are exothermic. The polymer which is obtained at high conversion is cross-linked and has the appearance of a swollen gel in the presence of water when the molar mass is not controlled. In the presence of transfer agents, it is known that it is possible to reduce the molar mass of the resulting polymer, as indicated above (EP 0 405 818), but the product obtained does not comply with all the control conditions as defined above, in the sense that a) The $IP_{exp}$ is larger than 2, even when the polymer is obtained by using a transfer agent (EP 0 002 771). The $IP_{exp}$ can then be reduced by dividing the polymer, by a physical or physico-chemical separation system (EP 0 046 573; EP 0 717 051).

b) The control takes place in the presence of large quantities of transfer agent: in certain cases, like the one mentioned above, the transfer agent is also the polymerisation solvent.

The Applicant has therefore imposed an ambitious objective on itself, which corresponds to the unsatisfied requirements of industry at the present time, that is to say to SIMULTANEOUSLY achieve the following two criteria:
a) $IP_v$ very low for molar masses $M_n$ greater than 1000, that is to say an $IP_{exp}<2$ without physical or physico-chemical separation and determined according to the IP called method.
b) Absence of gel at the time of polymerisation even at very high conversion rates, namely greater than 90%.

Preferentially, the Applicant has set out to SIMULTANEOUSLY achieve the following four criteria:
a) $IP_v$ very low for molar masses $M_n$ greater than 1000, that is to say an $IP_{exp}<2$ without physical or physico-chemical separation and determined according to the IP called method,
b) absence of gel at the time of polymerisation even at very high conversion rates, namely greater than 90%,
c) very high conversion rate (>90%) in a reasonable reaction time for industry, that is to say after 4 hours at 100° C., preferably at the end of 2 hours at 90° C. and at atmospheric pressure,
d) using a limited quantity of transfer agent or agents acceptable in industry, that is to say within limits which will for example be in the case in question 0.001% to 20% (molar) and 0.01% to 50% (by weight), more particularly between 0.01% and 10% and even more particularly between 0.01% and 5%.

In addition, in an entirely preferred manner, it will be sought to achieve the molecular weight aimed at with the greatest possible precision.

Even more preferentially, it will be ensured that a fifth criterion is also simultaneously achieved, namely that the molar masses in number increase strictly monotonically when the advancement of the reaction increases.

By "strictly" monotonically, the Applicant means the fact that the molar masses in number increase continuously, without even a horizontal stage; nor naturally a regression, which would be contrary to the "monotonic" character.

Thus in addition a total control of the reaction will be obtained.

Prior Art

A first way is known for reducing the $IP_v$ of the acrylic acid polymers and salts thereof, which is to operate in order to eliminate low molecular weight fractions, notably by extraction (EP 0 046 573).

The way chosen by the Applicant is to operate by means of a direct reduction of the $IP_v$ during polymerisation, and therefore a very much reduced $IP_v$ at the outlet from the polymerisation reactor.

It should be stated here that the $IP_v$ must be defined with precision in a complete and precise reference system, which will be done below, failing which a comparison with, for example, the prior art would have no meaning.

In the prior art, two main periods can be discerned.

Before 1996, there exist patents concerning the polymerisation of acrylic acid, but where the final product can under no circumstances meet the criteria sought by the invention, which were set out above.

For example, either the $IP_v$ was too high, or the conversion rate was much too low.

It was possible for example to obtain a very satisfactory $IP_v$, but at the cost of a conversion rate, under conditions acceptable in industry, of only 15%, or an excellent conversion rate (95%) but at the cost of a very mediocre $IP_v$ (see Table 1 below).

TABLE 1

| REFERENCE | COMPANY | Mw (g/mole) | $IP_{exp}$ |
|---|---|---|---|
| GX86 | COATEX | 3320 | 2.26 |
| AB 100 | COATEX | 5570 | 2.40 |
| P50 | COATEX | 10170 | 3.10 |
| COLLOID 211 | RHODIA INC. | 4380 | 2.29 |
| NOPCOSPERSE 44 | HENKEL | 7565 | 2.60 |
| DISPEX N40 | CIBA | 4655 | 2.51 |
| OROTAN 963 | ROHM & HAAS | 3550 | 2.35 |
| BELSPERSE 164 | CIBA | 3935 | 2.34 |
| ACUSOL 445 | ROHM & HAAS | 6030 | 2.26 |
| ACUMER 9300 | ROHM & HAAS | 5780 | 2.38 |
| POLYSTABIL MO | STOCKHAUSEN | 6520 | 2.39 |

After 1996, the technology known by the term "RAFT" appeared, whose corresponding prior art will be related below.

Radical polymerisation of the RAFT type (reversible addition fragmentation transfer) is a polymerisation method which was discovered very recently. In this method, a specific transfer agent (compound 1 CTA) is introduced into the reaction medium, in addition to the monomer (M) and the polymerisation initiator (I).

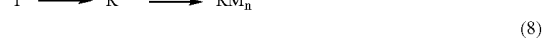

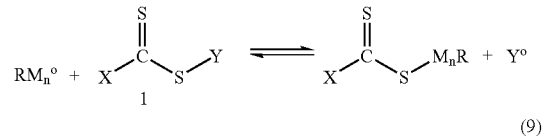

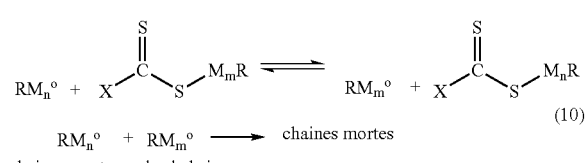

chaines mortes = dead chains

At a very low conversion rate, the initiator generates free radicals, which propagate (equation 7). Possibly these radicals react with the transfer agent 1 in order to give a new radical Y° and a transferred chain, terminating in the group X—C=S—S—. It should be noted that these transferred chains differ from the initial transfer agent only through the group Y: They can therefore be considered to be macro transfer agents. After a certain amount of time, the proportion of chains transferred is large enough for the transfer to take place between the free radicals and the dormant chains (equation 9) rather than between the free radicals and the CTA. The transfer reaction (9) being rapid (this is one of the necessary conditions for the polymerisation to be controlled), all the chains (radical and transferred) exchange rapidly with each other, and therefore increase at the same speed. Therefore, at the end of polymerisation, all the chains have the same length (to within a statistical enlargement) and the final polymolecularity index is therefore low. Theoretically, as the transfer does not change the concentration of free radicals, [R°], the speed of propagation is not affected by the presence of the compound. In addition, the number of dead chains (produced by radical coupling) corresponds exactly to the quantity of effective decomposed initiator. Therefore the polymerisation has controlled polymerisation characteristics if [I]<<[CTA].

FIGS. 3a and 3b show simulated kinetics of a RAFT polymerisation.

FIG. 3a shows concentration of the transfer agent (left-hand axis, black symbols) and polymolecularity index, $IP_v$ (right-hand axis, white symbols) for a transfer constant respectively of 3 (squares), 30 (diamonds) and 300 (triangles).

FIG. 3b shows mean molar mass in number according to the conversion, when $C_{tr}$ is equal to 3 (squares), 30 (diamonds) and 300 (triangles). Conditions for the simulation: [M]:[CTA]:[INIT]=1000:1:0.005 $k_p$=850 l/mol/s, $k_t$=10$^8$ l/mol/s, $k_i$=10$^{-5}$/s, [M]$_t$=8 mol/l.

FIG. 3, which resulted from our previous work (I Uzulina, S. Kanagasabapathy, J Clayerie, Macromol. Symp, 33-38, 2000) illustrates the behaviour of the polymerisation when the transfer constant (defined as the ratio of the kinetic transfer constants to propagation) increases. The greater this is, the more $IP_v$ approaches 1, the more the molar mass increases linearly with the conversion. A necessary condition of control for polymerisation of acrylic acid is therefore that the transfer constant is great. It should be noted that there exist no means of correctly choosing a transfer agent for this condition to be satisfied. Recent patents (WO 98/01478, WO 99/05099, WO 99/31144) recommend the use of certain transfer agents for fulfilling this function. In none of these patents however is the polymerisation of acrylic acid in an alcoholic, water-alcohol and aqueous medium described.

It has been shown that some of the compounds recommended by these patents were not suitable for polymerisation of acrylic acid.

For example, the patent WO 98/01478 describes the use of agents of the R—C(=S)—SR' type. In this patent, the synthesis of polyacrylic acid is described. Example 22: Reaction in DMF using PhC(=S)S—CHMePh. At 60° C., after 4 hours, the conversion is 17.5%.

There is no direct analysis of molar masses, and the polymer is methylated by an undescribed method in order to give polymethyl acrylate which for its part is analysed by SEC.

In Example 31, a block copolymer ABu-AA (where ABu is butyl acrylate, AA is acrylic acid) is prepared in dimethylformamide (DMF). The AA yield is 8.3%.

The results of this patent are set out in the article "Living Free Radical Polymerization by Reversible Addition-Fragmentation Chain Transfer: the RAFT Process", Macromolecules, 1998, 31, 5559 by J Chiefari, K. B. Chong, F. Ercole, J. Krstina, J.

Jeffery, T. P. T. Le, R. T. A. Mayadunne, G. F. Meijs, C. L. Moad, G. Moad, E. Rizzardo, S. H. Thang.

The polymerisation of acrylic acid is described in DMF (which is not one of the industrially acceptable or favoured solvents, for well known reasons of use, environment and problems related to the elimination of the DMF after polymerisation) at 60° C., giving 18% conversion in 4 hours.

In the book entitled "Controlled/Living Radical Polymerization" published by K.

Matyjaszewski, ACS Symposium Series 768, Year 2000, a chapter written by E. Rizzardo, J. Chiefari, Roshan T. A. Mayadunne, G. Moad and San H. Thang teaches the Applicant that it is possible to polymerise acrylic acid in the presence of a transfer agent of the Phenyl —C(=S)—S—C—CH$_3$)$_2$—C≡N type in methanol for conversion rates of around 50% after 16 hours reaction. Once again, polymers are analysed after methylation.

However, it turns out that, particularly on an industrial scale, it is necessary to polymerise at high conversions (more than 90%, or even more than 95%), whilst keeping control, as defined above. Moreover, it is necessary on an industrial scale to be able to effect polymerisation under moderate temperature conditions (below 100° C.) without the polymerisation lasting too long.

None of the aforementioned patents, nor the patents (WO 97/09400; WO 99/35177) which deal with the synthesis of block copolymers with compounds of the same family makes it possible to select a class of compounds of the transfer agent type which fulfil all the conditions which it is necessary to fulfil in order to polymerise acrylic acid with control in an aqueous or water-alcohol medium.

In fact, in the same patent, it is possible to find compounds which are clearly harmful to control and others which may suit. Our invention therefore comprises the selection of a suitable class of compounds which allow polymerisation of acrylic acid. For example, on the contrary, we found that compounds of the PhC(=S)SR type are very powerful inhibitors of the polymerisation of acrylic acid (Examples 26, 27 and 28), whilst their use is recommended in the patents WO 98/01478, WO 99/05099 and WO 99/31144. Likewise, we found that certain dithiocarbamates (Examples 30 and 31) do not make it possible to obtain a satisfactory control of the polymerisation whilst these same dithiocarbamates are recommended in the patents WO 99/31144 and WO 99/35177.

We note finally the patents WO 99/35177 and FR 2764892 exemplify the syntheses of block copolymers from xanthate, dithiocarbamate or dithioester compounds. In none of these patents is the polymerisation of acrylic acid exemplified as a first or second block, that is to say after reinitiation by a species of the macromolecular type. As the patents WO 99/35177 and FR 2764892 disclose block copolymers without any acrylic acid unit, they cannot help a person skilled in the art to select a suitable transfer agent for controlled homopolymerisation of acrylic acid or for statistical copolymerisation with a water-soluble comonomer, the object of the present invention.

The patent WO 98/01478 does not claim the use of compounds of the RO—C(=S)—SR' type, but all kinds of compounds R—C(=S)—SR' and maybe C(=O)—O—C (=S)—SR'.

The patent WO 99/31144 does not describe the polymerisation of acrylic acid, whilst this was described in the previous document.

The patent FR 2764892 describes the synthesis of novel block copolymers obtained by bringing together a generator of radicals (a conventional initiator), vinyl monomers (amongst which are cited acrylic acid and methacrylic acid) and a polymer precursor, of general formula A-C(S)B—P, obtained by radical polymerisation of usual monomers, but in the presence of RAFT catalysts. Amongst these catalysts, xanthates are cited, recommended and exemplified.

The monomers used as a precursor are styrene, methyl acrylate, vinyl acetate and ethylhexyl acrylate. The second block is produced with styrene or methyl acrylate.

There is no reference to any yield and the polymers obtained are precipitated with SEC analyses.

The present invention relates to homopolymers of acrylic acid and copolymers of said acid with at least one of the water-soluble monomers chosen from amongst methacrylic acid, itaconic, maleic or fumaric acid, 2-acrylamido-2-methyl-1-propane sulphonic acid in acidic or partially neutralised form, 2-methacrylamido-2-methyl-1-propane sulphonic acid in acidic or partially neutralised form, 3-methacrylamido-2-hydroxy-1-propane sulphonic acid in acidic or partially neutralised form, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid as well as all their salts, vinyl sulphonic acid, sodium methallylsulphonate, sulphopropyl acrylate or methacrylate, sulphomethylacrylamide, sulphomethylmethacrylamide or from amongst acrylamide, methacrylamide, n-methylolacrylamide, n-acryloylmorpholine, ethylene glycol methacrylate, ethylene glycol acrylate, propylene glycol methacrylate, propylene glycol acrylate, propene phosphonic acid, ethylene or propylene glycol acrylate or methacrylate phosphate or from amongst vinylpyrrolidone, methacrylamido propyl trimethyl ammonium chloride or sulphate, trimethyl ammonium ethyl chloride or sulphate methacrylate, as well as their acrylate and quaternised or not acrylamide homologues, and/or ammonium dimethyldiallylchloride, as well as mixtures thereof.

There therefore exists, in spite of the progress made by "RAFT" technology, a significant recognised need for a method, and adapted transfer agents, for homopolymerisation of acrylic acid or copolymerisation of acrylic acid with at least one water-soluble monomer as aforementioned, fulfilling the above criteria.

SUMMARY OF THE INVENTION

The invention therefore concerns, in its most general aspect, a method for the homopolymerisation of acrylic acid and of its salts or copolymerisation of acrylic acid with at least one water-soluble monomer as aforementioned, in solution, for obtaining non cross-linked polymers, characterised in that it uses as transfer agents products chosen from amongst those defined by the general formula:

R—X—C(S)—S—R' in which:

X=O or S,

R represents a group for stabilising the function R—X by a covalent bond of the C—X type, R' represents a group such that the R'—S bond is a bond of the C—S type.

The method according to the invention is preferentially characterised in that the solvent system of the polymerisation is an aqueous or water-alcohol system, the alcohols in question having 1 to 4 carbon atoms inclusive, and being able to be primary, secondary or tertiary, preferably primary or secondary.

It has to be noted, that by water-alcohol system the Applicant means system containing water and the above-cited alcohols, the water content being so low as 5 000 ppm compared to the solvent.

In an entirely preferred manner,

R is a group chosen from amongst the aryl or alkyl or phenyl groups, these groups being able to be substituted by radicals of the heterocyclic, alkylthio, alkoxycarbonyl, aryloxycarbonyl, carboxy, acyloxy, carbamoyl, cyano, dialkyl- or diaryl-phosphonato, dialkyl- or diarylphosphinato or carboxyl or carbonyl type or ethers or alcohols or mixtures thereof and R' is a group comprising at least one secondary or tertiary carbon atom bonded to the sulphur atom.

In an even more preferred manner,

If X=O,

R is an aryl or phenyl group or phenyl carrying one or more ester, ether, acid, alcohol, amine, sulphate, sulphonate, phosphate, phosphonate or ketone groups, R' is a group attached to the sulphur atom by a secondary or tertiary carbon, at least one of the substituents of which is a phenyl or carbonyl group, If X=S, R=R' with R' a group identical to that already cited.

Finally, in an entirely preferred manner, the transfer agents are chosen from amongst

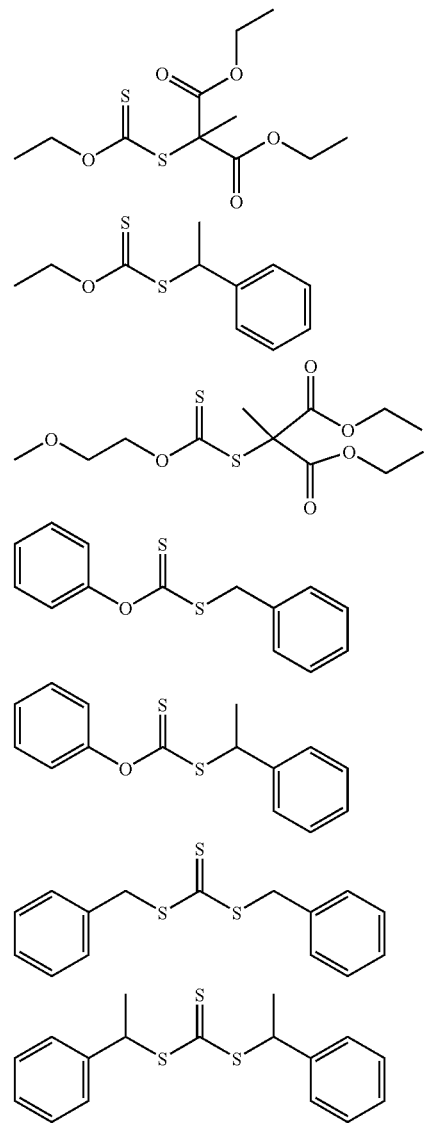

According to a particularly preferred embodiment, the method is also characterised in that the reaction parameters and the choice of the transfer agents are adapted so that it makes it possible to SIMULTANEOUSLY achieve the following two criteria:
a) very low $IP_v$ for molar masses $M_n$ greater than 1000, that is to say an $IP_{exp}<2$ without physical or physico-chemical separation and determined according to the IP called method,
b) absence of gel on polymerisation even at very high conversion rates, namely greater than 90%.

Preferentially, the Applicant set out to SIMULTANEOUSLY achieve the following four criteria:
a) very low $IP_v$ for molar masses $M_n$ greater than 1000, that is to say an $IP_{exp}<2$ without physical or physico-chemical separation and determined according to the IP called method,
b) absence of gel on polymerisation even at very high conversion rates, namely greater than 90%,
c) very high conversion rate (>90%) in a reasonable reaction time for industry, that is to say after 4 hours at 100° C., preferably after 2 hours at 90° C. and at atmospheric pressure,
d) using a quantity of transfer agent or agents which is limited and acceptable in industry, that is to say within limits which will for example in the case in question be 0.001% to 20% (molar) and 0.01% to 50% (by weight), more particularly between 0.01% and 10% and even more particularly between 0.01% and 5%.

Even more preferentially, it will be ensured that a fifth criterion is also simultaneously achieved, namely that the molar masses by number increase strictly monotonically when the advancement of the reaction increases.

By "strictly" monotonic, the Applicant means the fact that the molar masses by number increase continuously, without even a horizontal stage; nor naturally a regression, which would be contrary to the "monotonic" character.

The invention also relates to the transfer agents used in the above method, as well as the polymers obtained by the above method, and the applications of these polymers in industry, and the industrial products, characterised in that they were obtained by employing the said polymers.

More particularly the invention relates to the application of these polymers in industrial fields such as notably the papermaking field and in particular in paper coating and the mass filling of paper, in the petroleum field, or the fields of paint, Water treatment, detergents, ceramics, cements or hydraulic binders, civil engineering, inks and varnishes, the sizing of textiles or the finishing of leather, and more particularly concerns the application of these polymers as a dispersing agent and/or grinding aid agent for mineral materials such as natural calcium carbonate, precipitated calcium carbonate, kaolin, titanium dioxide or clays.

Thus the invention relates to the aqueous suspensions of mineral fillers containing the said polymers and more particularly containing 0.05% to 5% by dry weight of the said polymer with respect to the total dry weight of the mineral fillers.

These aqueous suspensions of mineral fillers are also characterised in that the mineral filler is chosen from amongst natural calcium carbonate such as notably calcite, chalk or marble, synthetic calcium carbonate, also known as precipitated calcium carbonate, dolomites, magnesium hydroxide, kaolin, talc, gypsum, titanium oxide, or aluminium hydroxide or any other mineral filler normally used in the fields such as notably the papermaking field and in particular in paper coating and the mass filling of paper, petroleum, paint, water treatment, detergents, ceramics, cements or hydraulic binders, civil engineering, inks and varnishes, the sizing of textiles or the finishing of leather.

The papers manufactured and/or coated according to the invention are characterised in that they contain the said aqueous suspensions of mineral fillers according to the invention.

The paint formulations according to the invention are characterised in that they contain the said aqueous suspensions of mineral fillers according to the invention.

The drilling muds according to the invention are characterised in that they contain the said aqueous suspensions of mineral fillers according to the invention.

In practice the dispersion operation, also referred to as an operation of dispersing the mineral filler to be dispersed, can be effected in two different ways.

One of the ways consists in effecting, under stirring, the preparation of a suspension of mineral fillers by introducing all or some of the dispersing agent according to the invention in the aqueous phase, and then the mineral material, so as to obtain the aqueous suspension of mineral fillers used in the aforementioned fields of application.

Another way consists in preparing the suspension of mineral fillers by introducing, into the mineral filler cake, all the quantity of dispersing agent to be tested so as to obtain the aqueous suspension of mineral fillers used in the aforementioned fields of application. This dispersion operation can follow on from the grinding operation described below or be implemented in a totally independent manner.

Thus, in practice, the operation of grinding the mineral substance to be refined consists in grinding the mineral substance with a grinding body into very fine particles in an aqueous medium containing the grinding aid agent.

To the aqueous suspension of the mineral substance to be ground, there is added the grinding body with a granulometry advantageously between 0.20 and 4 millimetres. The grinding body is generally in the form of particles of materials as diverse as silicon dioxide, aluminium oxide, zirconium oxide or mixtures thereof, as well as high-hardness synthetic resins, steels or others. One example of a composition of such grinding bodies is given by the patent FR 2303681, which describes grinding elements formed 30% to 70% by weight of zirconium oxide, 0.1% to 5% aluminium oxide and 5 to 20% silicon dioxide.

The grinding body is preferably added to the suspension in a quantity such that the ratio by weight between this grinding material and the mineral substance to be ground is at least 2/1, this ratio preferably being between the limits 3/1 and 5/1.

The mixture of the suspension and grinding body is then subjected to the mechanical agitation action, such as the one which occurs in a conventional grinder with microelements.

The time required for arriving at the required fineness of the mineral substance after grinding varies according to the nature and quantity of the mineral substances to be ground, and according to the stirring mode used and the temperature of the medium during the grinding operation.

The aqueous suspensions thus obtained can be used in the field of paper as a mass filler or in coating.

During the manufacture of the sheet of paper, that is to say during their use as a mass filler, these suspensions can be used with the coating broke.

They can also be used in the field of paint or drilling muds.

DETAILED DESCRIPTION OF THE INVENTION

Figure 1:
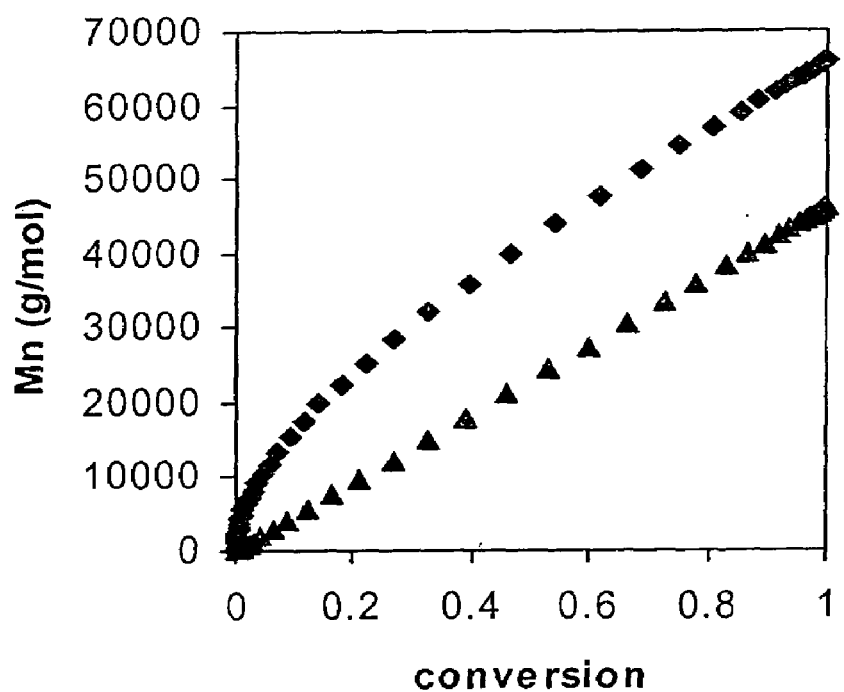
FIG. 1 is a graph showing molar mass $M_n$ as a function of conversion.
Figure 2:
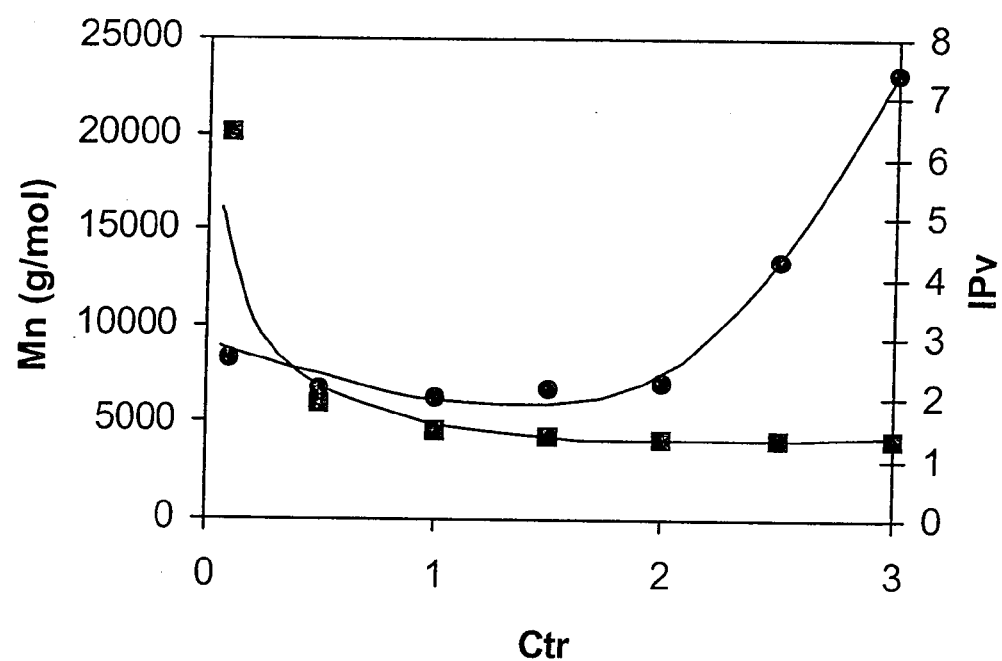
FIG. 2 is a graph showing molar mass $M_n$ and polymolecularity index $IP_y$ as a function of the transfer constant Ctr.
Figure 3A:
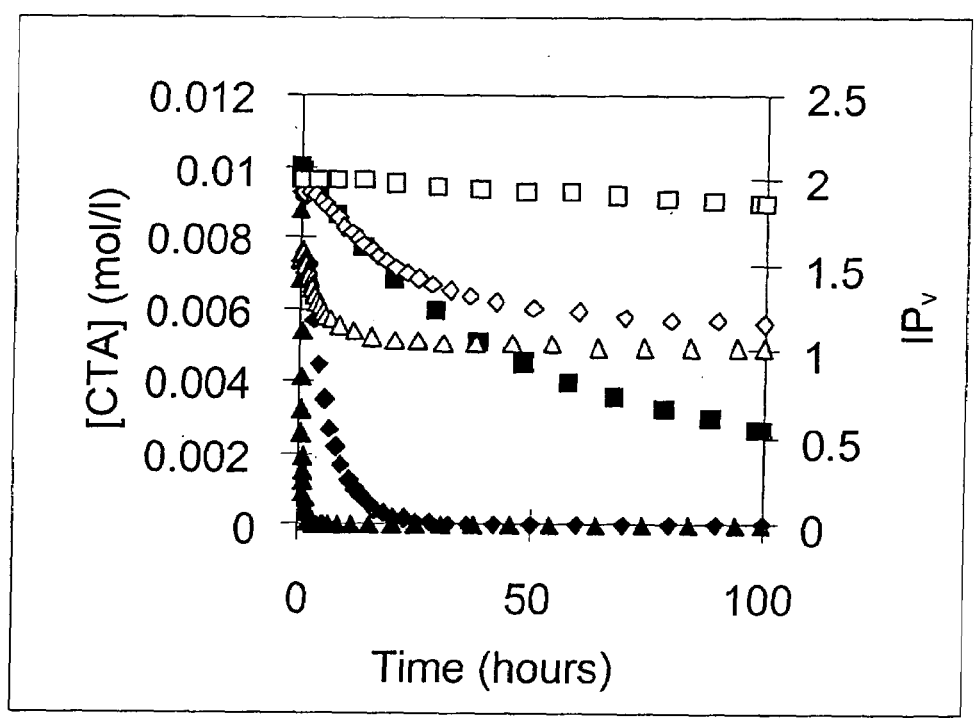
FIG. 3a is a graph showing concentration of transfer agent CTA and polymolecularity index, $IP_y$ as a function of time.
Figure 3B:
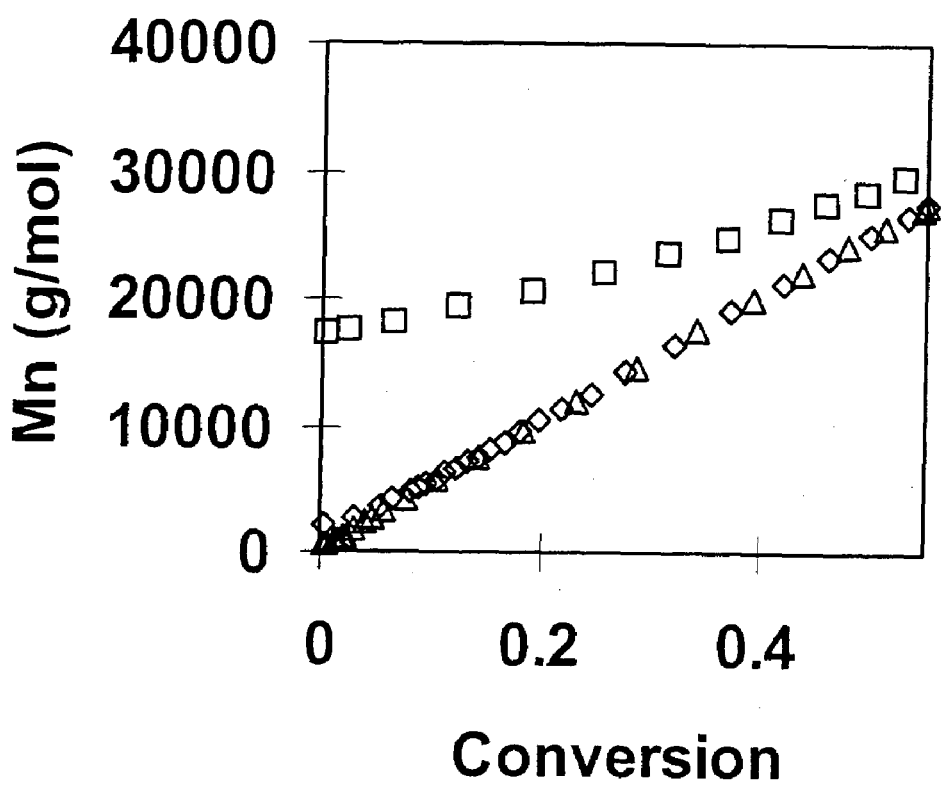
FIG. 3b is a graph showing mean molar mass $M_n$ as a function of conversion.

The invention therefore notably relates to a method as described above, preferred but non-limitative embodiments of which will be given below.

"Transfer agents" will mean, in the present application, including the claims, transfer agents of the type employed in RAFT technology, that is to say those capable of stopping the growth of polymer chains but in a non-irreversible manner.

The transfer agent or agents used in the method according to the invention are products chosen from amongst those defined by the general formula:

R—X—C(S)—S—R' in which:

X=O or S,

R represents a group for stabilising the function R—X by a covalent bond of the C—X type, R' represents a group such as the R'—S bond, that is to say a bond of the C—S type.

In an entirely preferred manner,

R is a group chosen from amongst the aryl or alkyl or phenyl groups, these groups being able to be substituted by radicals of the heterocyclic, alkylthio, alkoxycarbonyl, aryloxycarbonyl, carboxy, acyloxy, carbamoyl, cyano, dialkyl- or diaryl-phosphonato, dialkyl- or diarylphosphinato type or carboxyls or carbonyls or ethers or alcohols or mixtures thereof, and R' is a group comprising at least one secondary or tertiary carbon atom bonded to the sulphur atom, In an even more preferred manner, If X=O, R is an aryl or phenyl group or phenyl carrying one or more ester, ether, acid, alcohol, amine, sulphate, sulphonate, phosphate, phosphonate or ketone groups, R' is a group attached to the sulphur atom by a secondary or tertiary carbon, at least one of the substituents of which is a phenyl or carbonyl group, If X=S, R=R' with R' a group identical to the one already cited.

Finally, in an entirely preferred manner, the transfer agents are chosen from amongst

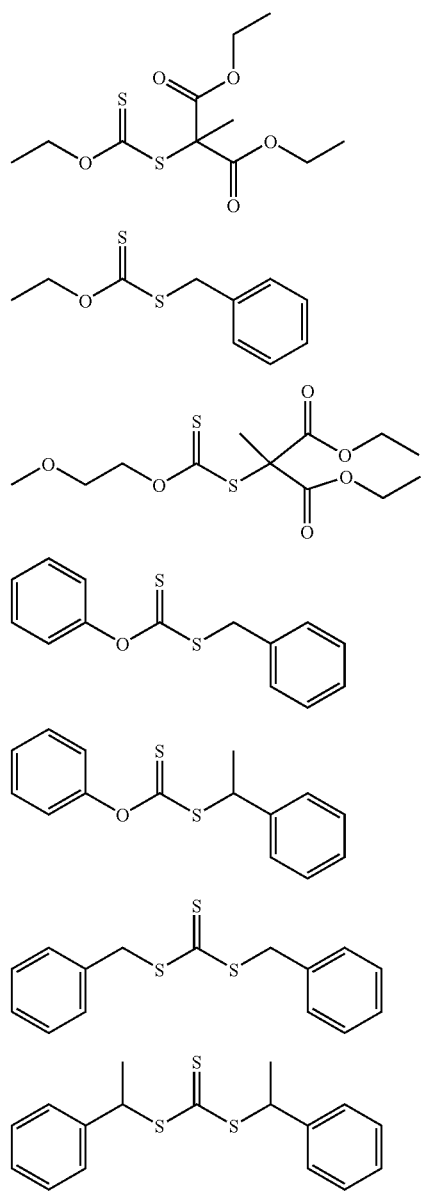

According to an entirely preferred embodiment, the transfer agents are chosen so that they result in a growth of molecular masses by number, when the reaction progresses, which is "strictly monotonic".

According to yet another preferred embodiment, the transfer agents are in this case chosen from amongst the following:

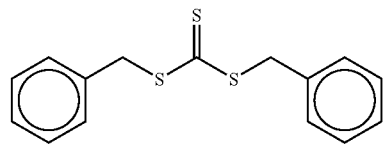

-continued

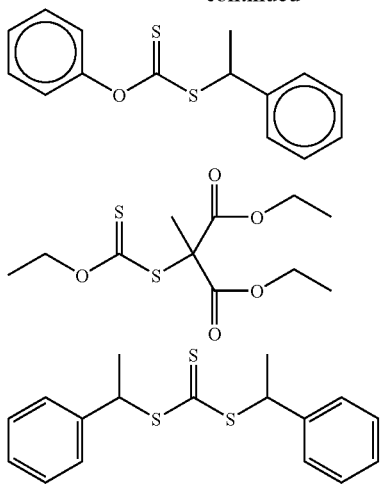

This provision makes it possible to achieve with precision the sought for molecular weight from the starting reagents, that is to say the property which is very much appreciated in industry of being able to obtain the required molecular weight. If for example, when the conversion rate is 90%, the molar mass by number is 3500 g/mole, it will be known that, in order to obtain a molar mass by number of only 1800, it will be appropriate to stop the polymerisation at 45%.

The invention aims at molar masses $M_n$ of around 1000 to 1 million (1M) daltons, preferably 2000 to 1,000,000, preferably 2000 to 500,000, preferably 2000 to 300,000, preferably 2000 to 50,000, preferably 2000 to 30,000, and highly preferably 2000 to 15,000 daltons.

According to yet another preferred embodiment, the transfer agent quantity limits are fixed so that the molar ratio of transfer agent to monomer is between 0.001% and 20% and the mass ratio of transfer agent to monomer is between 0.01% and 50%.

Preferably the molar ratio of transfer agent to monomer is between 0.01% and 10% and the mass ratio of transfer agent to monomer is between 0.01 and 10%.

Preferably the molar ratio of transfer agent to monomer is between 0.1% and 5% and the mass ratio of transfer agent to monomer is between 0.01% and 5%.

In an entirely preferred manner, the molar ratio of transfer agent to monomer is 2% and the mass ratio of transfer agent to monomer is between 0.5% and 5%.

The invention therefore relates to the transfer agents used in the above method, as well as the polymers obtained by the above method, together with the applications of these polymers in industry, and the industrial products, characterised in that they were obtained using the said polymers.

More particularly the invention relates to the application of these polymers in industrial fields such as notably the papermaking field and in particular in paper coating and the mass filling of paper, in the petroleum field, or the fields of paint, water treatment, detergents, ceramics, cements or hydraulic binders, civil engineering, inks and varnishes, the sizing of textiles or the finishing of leather, and more particularly concerns the application of these polymers as a dispersing agent and/or grinding aid agent for mineral materials such as natural calcium carbonate, precipitated calcium carbonate, kaolin, titanium dioxide or clays.

The aqueous suspensions of mineral fillers according to the invention are characterised in that they contain the said polymers and more particularly in that they contain 0.05% to 5% by dry weight of the said polymer with respect to the total dry weight of mineral fillers.

These aqueous suspensions of mineral fillers are also characterised in that the mineral filler is chosen from amongst natural calcium carbonate such as notably calcite, chalk or marble, synthetic calcium carbonate, also known as precipitated calcium carbonate, dolomites, magnesium hydroxide, kaolin, talc, gypsum, titanium oxide or aluminium hydroxide or any other mineral filler normally used in the fields such as notably the papermaking field, in particular in the coating of paper and the mass filling of paper, petroleum, paint, water treatment, detergents, ceramics, cements or hydraulic binders, civil engineering, inks and varnishes, the sizing of textiles or the finishing of leather.

The papers manufactured and/or coated according to the invention are characterised in that they contain the said aqueous suspensions of mineral fillers according to the invention.

The paint formulations according to the invention are characterised in that they contain the said aqueous suspensions of mineral fillers according to the invention.

The drilling muds according to the invention are characterised in that they contain the said aqueous suspensions of mineral fillers according to the invention.

Other characteristics and advantages of the invention will be better understood from a reading of the following non-limitative examples.

The conversion rate of acrylic acid into polyacrylic acid is measured by two distinct and concordant methods. In the first method, known as gravimetric, the weight of dry material per weight of solution is calculated. For this purpose, a quantity of solution is added to a calibrated crucible. The whole is evaporated under vacuum of 1 mm Hg (mercury) at room temperature and then in an oven at 140° C. under partial vacuum at 17.4 mbars, for 5 hours. The level of dry matter (DM) is obtained by the ratio of the weight of solid remaining in the crucible after heat treatment to the weight of the whole initially introduced. The conversion into acrylic acid is given by the ratio of the following values:

$$\text{Conversion} = \frac{DM_{experimental} - DM(t=0)}{DM(t=\text{infinite}) - DM(t=0)}$$

The values DM(t=0) and DM(t=infinite) are respectively obtained by calculating the dry matter levels when the acrylic acid is not yet polymerised (DM(t=0)) and when the acrylic acid has been completely polymerised (DM(t=infinite)).

In the second method, the quantity of residual acrylic acid is obtained by high-pressure liquid chromatography. In this method, the components making up the mixture are separated on a stationary phase, and detected by a UV detector. After calibration of the detector, it is possible, from the area of the peak corresponding to the acrylic compound, to obtain the quantity of residual acrylic acid. This method forms part of the state of the art, and is described in many reference works such as, for example, in the manual "Experimental Organic Chemistry", by M. Chavanne, A. Julien, G. J. Beaudoin, E. Flamand, second edition, published by Modulo, Chapter 18, pages 271-325.

In the examples given below, the experimental SEC conditions are as follows: 1 ml of polymerisation solution is put on a crucible, which is then evaporated at room temperature under vacuum by means of a vane pump. The solute is taken up by 1 ml of the eluant of the SEC, and the whole is then injected into the SEC apparatus. The eluant of the SEC is a solution of NaHCO$_3$: 0.05 mol/l, NaNO$_3$: 0.1 mol/l, triethylamine 0.02 mol/l, NaN$_3$ 0.03% by weight. The SEC line contains an isocratic pump (Waters 515), the output of which is adjusted to 0.5 ml/min, an oven containing a precolumn of the "Guard Column Ultrahydrogel Waters™" type, a linear column with an inside diameter of 7.8 mm and a length of 30 cm of the "Ultrahydrogel Waters™" type and a refractometric detector of the RI Waters™ 410 type. The oven is raised to a temperature of 60° C. and the refractometer to 50° C. The software for detecting and processing the chromatogram is the SECential software supplied by "L.M.O.P.S. CNRS, Chemin du Canal, Vernaison, 69277". The SEC is calibrated by a series of 5 sodium polyacrylate standards supplied by Polymer Standards Service, with the references PAA 18K, PAA 8K, PAA 5K, PAA 4K, PAA 3K.

EXAMPLE 1

This example relates to the preparation of the different compounds which can be used as transfer agents.

Test N° 1:
This test relates to the preparation of compound A

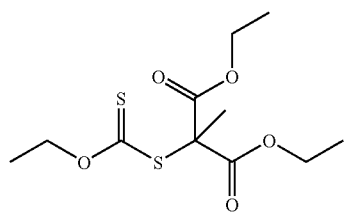

Compound A 8.8 g of potassium O-ethyldithiocarbonate is dissolved in 55 ml of water. Next 0.50 g of Aliquat 336 and 13.9 g of diethyl 2-bromo-2-methylmalonate are added to the aqueous solution. The whole is stirred vigorously with a magnetic bar at 15° C., until the aqueous phase becomes colourless. 2.3 g of potassium O-ethyldithiocarbonate is then once again added to the mixture. It is left to stir for 20 minutes. The product is separated from the aqueous phase by extraction with twice 60 ml of diethylether. The organic phase is then washed with three times 10 ml of water. The organic phase is next dried with magnesium sulphate for one hour. The solution is filtered on a silica column with a diameter of 5 cm and a height of 3 cm. The organic phase collected is then evaporated on a rotary evaporator. 14.6 g of a dark yellow oil is recovered (yield of A: 90%).

Test N° 2:
This test relates to the preparation of compound B

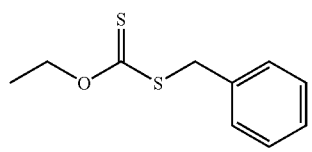

Compound B 0.80 g of potassium O-ethyldithiocarbonate is dissolved in 10 ml of ethanol at 50° C.

Next, 0.85 g of benzyl bromide is added dropwise to the solution at this temperature for minutes. The whole is stirred with a magnetic bar at 50° C. for 5 hours. The mixture is then diluted with water (30 ml) and extracted with three times 25 ml diethylether. The organic phase is then dried with magnesium sulphate, then filtered and finally evaporated on a rotary evaporator. 0.90 g of B is recovered in the form of a yellow oil (yield of B: 88%).

Compound C is described in the patent WO 99/31144 (J. Chiefari, R. T. A. Mayadunne, G. Moad, E. Rizzardo, S. H. Thang, PCT Int. Appl. WO 99/31144).

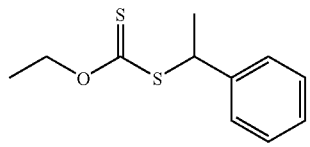

Compound C

Test N° 3:
This test relates to the preparation of compound D

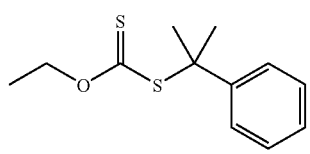

Compound D 0.80 g of potassium O-ethyldithiocarbonate is dissolved in 5 ml of ethanol at 50° C. Next, 1.00 g of benzene (1-bromo-1-methylethyl) is added dropwise to the solution at 50° C. for 10 minutes. The whole is stirred with a magnetic bar at 50° C. for 3 hours. The mixture is next diluted with 30 ml of water and extracted with three times 25 ml of diethylether. The organic phase is next dried with magnesium sulphate, and then filtered and finally evaporated on a rotary evaporator. 0.41 g of D is recovered in the form of a yellow oil (yield of D: 34%).

Test N° 4:
This test relates to the preparation of compound E

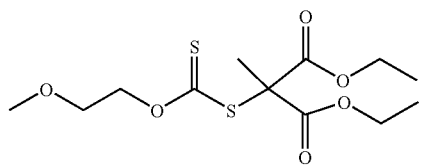

Compound E 6.60 g of KOH (in powder form) is dissolved in 15.2 g of 2-methoxyethanol. After cooling of the solution to 10° C., 7.61 g of carbon disulphide is added dropwise over 5 minutes. The mixture is left for one night without stirring at room temperature and then put in suspension in ether. The precipitate is filtered, washed with ether and dried. 18.3 g of potassium O-(2-methoxyethyl)dithiocarbonate is recovered (yield: 96%). 0.95 g of this product is dissolved in 5 ml of water and neutralised by means of a solution of HCl (1:100). Next, 50 mg of Aliquat 336 and 1.27 g of diethyl 2-bromo-2-methyl malonate is added. The mixture is then stirred vigorously at room temperature until the aqueous phase becomes colourless. After which, 0.48 g of potassium O-(2- methoxyethyl)dithiocarbonate dissolved in 2.5 ml of water is neutralised and is once again added and the mixture is stirred for one hour. Finally, the product is extracted with ether (1×60 ml, 1×30 ml). The organic phase extracted is washed with water (3×10 ml). After drying with magnesium sulphate, the solution is filtered on a silica column with a diameter of 5 cm and a height of 1.5 cm with ether as the eluant. The evaporation results in 1.49 g of a yellow oil (yield of E: 92%).

Compound F was synthesised according to the description of the patent WO 99/31144 (J. Chiefari, R. T. A. Mayadunne, E. Rizzardo, S. H. Thang, PCT Appl. WO 99/31144).

Compound F

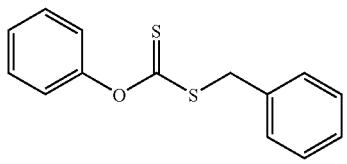

Test N° 5:
This test relates to the preparation of compound G

Compound G

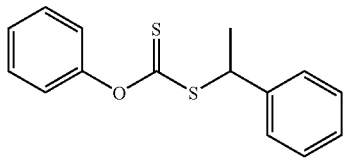

A mixture of 0.40 g of NaOH and 0.86 g of 1-phenyl ethanethiol in 10 ml of water is stirred for 15 minutes at room temperature by means of a magnetic bar. 0.86 g of phenylchlorothionoformate is then added. The formation of a yellow oil is observed and, after two hours, 30 ml of diethylether and 25 ml of water are added. The organic phase is separated from the aqueous phase. The aqueous phase is then treated three times with 10 ml of diethylether, and the organic phases are combined. These are then washed twice with 10 ml of water. The organic phase is next dried with magnesium sulphate for 1 hour. The solution is filtered and evaporated on a rotary evaporator, in order to give 1.34 g of a yellow oil (yield of G: 85%).

Test N° 6:
This test relates to the preparation of compound H

Compound H

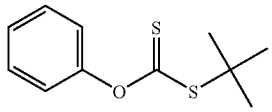

0.56 g of sodium 2-methyl-2-propanethiolate and 0.20 g of NaOH are dissolved in 10 ml of water. After 15 minutes at room temperature, 0.86 g of phenylchlorothionoformate is added. The mixture is stirred for 2 hours at room temperature. Next the mixture is diluted with water (25 ml) and extracted with ether (3×20 ml). The organic phase is extracted and washed with water (2×10 ml). After drying with magnesium sulphate, the solution is filtered and evaporated on a rotary evaporator. The product is purified on a column of silica with petroleum ether and then a mixture of petroleum ether and ethyl acetate (98:2) as eluants. 0.33 g of compound H in the form of a yellow oil is recovered (yield of H: 29%).

Compound I is sold by Sigma-Alrich (L'Isle d'Abeau Chesnes-BP 701, 38297 Saint Quentin Fallavier, France), under the reference 15,788-0.

Compound I

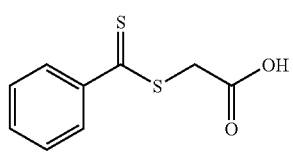

Compound J was described by G. Drosten, P. Mischke, J. Voss, Chem. Ber., 120, 1757-1762, (1987).

Compound J

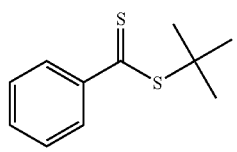

The synthesis of compound K is described in the literature by N. H. Leon, R. S. Asquith, *Tetrahedron*, 26, 1719-1725, (1970).

Compound K

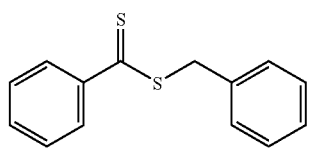

Test N° 7:
This test relates to the preparation of compound L

Compound L

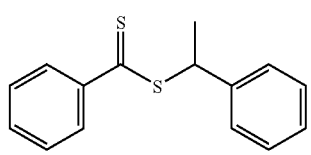

1.06 g of S-(thiobenzoyl)thioglycolic acid (compound I) and 0.40 g of NaOH are dissolved in 40 ml of water at room temperature. Then 0.76 g of 1-phenyl ethanethiol is added. After stirring at room temperature for 2 hours, the product is extracted by means of ether (1×60 ml, 1×30 ml). The organic phase extracted is washed with an aqueous solution of NaOH (0.1N, 3×30 ml) and water (3×30 ml). Drying on magnesium sulphate, filtration and evaporation result in 1.07 g of a dark red liquid (yield of L: 83%).

M, N and P were synthesised according to the description in the patent WO99/31144 (J. Chiefari, R. T. A. Mayadunne, E. Rizzardo, S. H. Thang, WO99/31144).

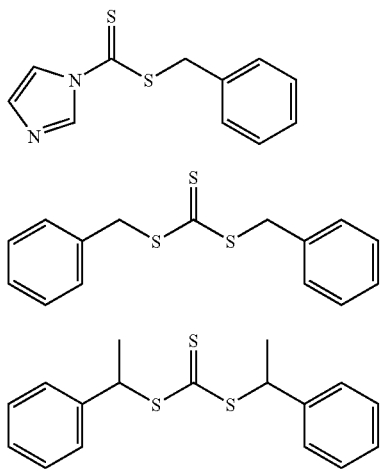

Compound M

Compound N

Compound P

Test N° 8:

This test relates to the preparation of compound O

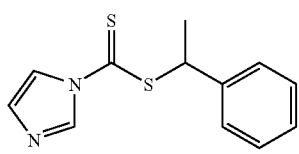

Compound O 0.69 g of 1-phenylethanethiol is added to a solution of 0.89 g of thiocarbonyl diimidazole in 10 ml of dichloromethane at room temperature for 20 minutes. The solution is left for 16 hours under stirring at the same temperature. Next the solvent is eliminated under vacuum. The mixture is filtered on a silica column with a mixture of petroleum ether and ethyl acetate (7:3) as eluant. 0.63 g of O in the form of a yellow oil (yield of O: 54%) and 0.38 g of P in the form of a yellow oil are obtained.

EXAMPLE 2

This example relates to the polymerisation method using the transfer agents of Example 1.

Test N° 9:

This test illustrates the four criteria of the method according to the invention of polymerising acrylic acid in the presence of compound A in ethanol.

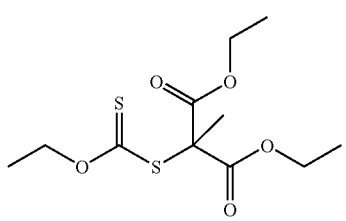

A

In a 100 ml glass receptacle, 408 mg of compound A is dissolved in 5.0 g of previously distilled acrylic acid. 15 g of absolute ethanol (Rectapur™ from Prolabo with the reference 20 820.327) is added to this solution. For one hour, the solution is degassed by bubbling with argon. 39 mg of 4,4'-azobis-4-cyanovaleric diacid is added to the solution. The percentage by weight of acrylic acid in the solution is 25%. The whole is then heated away from light, by immersion in an oil bath whose temperature is fixed at 90° C. The polymerisation is next stopped after 2 hours by adding approximately 50 mg of radical polymerisation inhibitor (2,6-di-tert.-butyl-4-methylphenol: BHT) and leaving the reaction medium to cool to room temperature. The polymer is formed in the absence of gel. The conversion rate measured by the two methods is then greater than 99%. Immediately afterwards, a portion of soda with a molarity of 10 mol/l is then added to the medium, until the pH becomes greater than 10. The mixture is then stirred for two hours at room temperature. The mean molar mass by polymer number is 2930 g/mol, and the experimental polymolecularity index is 1.8.

This polymerisation complies with the four criteria a), b), c) and d) of the method according to the invention.

Test N° 10:

This test illustrates the fifth criterion of the method of polymerising acrylic acid in the presence of compound A according to the invention.

The operating conditions are similar to those described in Test N° 9. The experiment is reproduced twice (A, B) (Table 2). This example shows that the molar mass changes proportionally with the conversion (FIG. 4) and illustrates criterion e) of the method according to the invention.

TABLE 2

Changes in the mean molar mass by number $\overline{M_n}$ and in the experimental polymolecularity index during the polymerisation carried out according to Test N° 10.

| Experiment | Conversion [%] | $\overline{M_n}$ [g/mol] | IP$_{exp}$ |
|---|---|---|---|
| B | 26 | 1220 | 1.9 |
| B | 87 | 1850 | 2.0 |
| A | 91 | 2330 | 1.8 |
| B | 93 | 2870 | 1.8 |
| A | 96 | 2450 | 1.8 |
| A | 98 | 2840 | 1.7 |
| A | 99 | 2810 | 1.8 |
| A | 100 | 2930 | 1.8 |
| B | 100 | 2885 | 1.8 |

Figure 4:
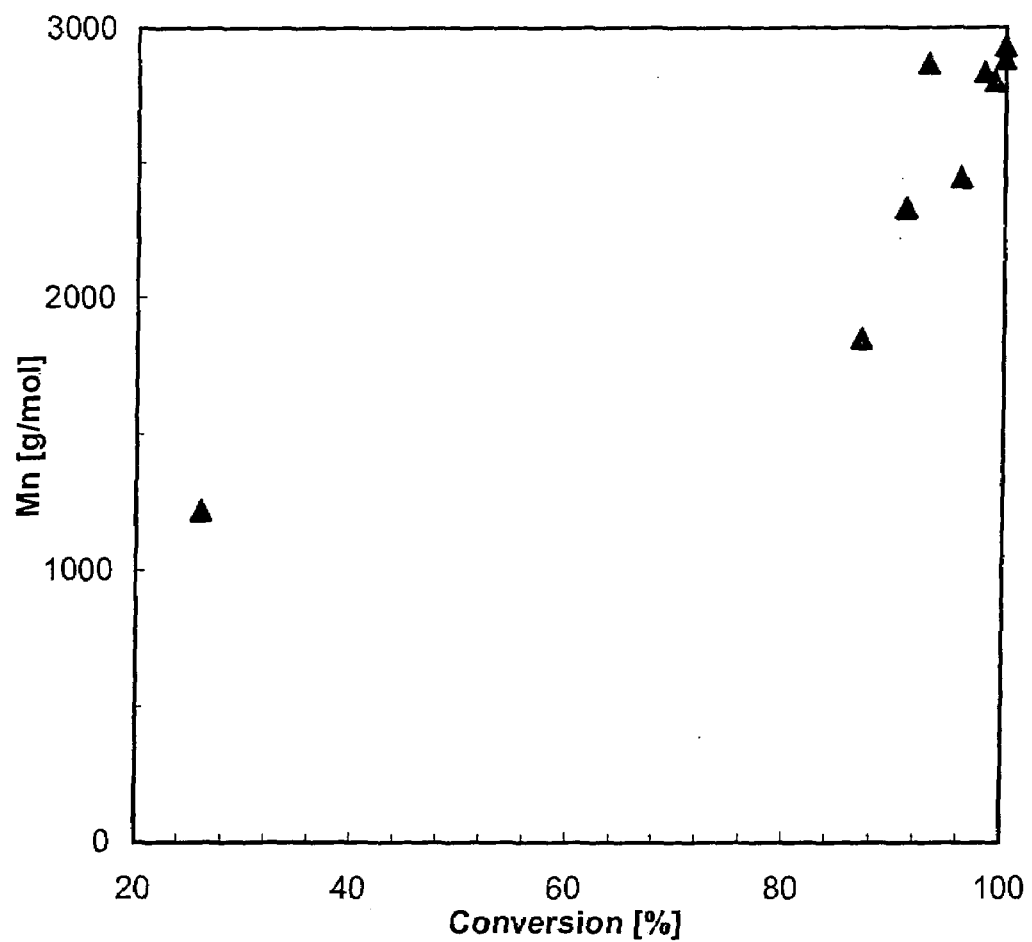
FIG. 4 is a graph showing change in the mean molecular mass $\overline{M_n}$ as a function of conversion.

FIG. 4 shows change in the mean molecular mass in terms of number $\overline{M_n}$ with the conversion into polyacrylic acid.

Test N° 11:

This test illustrates the invention and relates to the polymerisation of acrylic acid in the presence of compound A with multiplication, by thirty, of the quantities by weight.

In a 1 litre glass reactor, 12.2 g of compound A is dissolved in 150 g of acrylic acid (molar ratio AA:CTA=50:1). 450 g of absolute ethanol (Rectapur™ from Prolabo with the reference 20 820.327) is added to the solution and, after degassing, 1.17 g of 4,4'-azobis-4-cyanovaleric diacid. Stirring is carried out by means of a glass anchor 210 rev/min. After 1 hour of polymerisation at reflux, the polymerisation is stopped by adding BHT. The reaction medium is left to cool to room temperature. Immediately afterwards, a portion of soda equimolar with respect to the acrylic acid initially introduced dissolved in a minimum quantity of water is then added to the medium. The mixture is then stirred for two hours and the alcohol distilled so as to obtain an aqueous solution of polyacrylate.

A comparison of the conversions (determined by gravimetry) of the mean molar masses by number and the experimental polymolecularity indices obtained at the end of one hour according to the method of Test N° 9 (Experiment A) and according to the method of Test N° 11 (Experiments B and C) is presented in the following table.

TABLE 3

Changes in the mean molar mass in terms of number $\overline{M_n}$ and in the experimental polymolecularity index during the polymerisation carried out according to Test N° 9 (A) and Test N° 11 (B and C).

| Experiment (after 1 hour) | Conversion [%] | $\overline{M_n}$ [g/mol] | $IP_{exp}$ |
|---|---|---|---|
| A | 98 | 2840 | 1.7 |
| B | 95 | 2780 | 1.8 |
| C | 92 | 2510 | 1.8 |

The polymerisation is not affected by a multiplication of the quantities by weight of reagents.

Test N° 12:

This test illustrates the invention and relates to the polymerisation of acrylic acid in the presence of compound A in isopropanol.

The operating conditions are similar to those described in Test N° 9. In 5.0 g of acrylic acid there is dissolved 408 mg of compound A. 15 g of isopropanol (95% content in water) is added to the solution and, after degassing, 39 mg of 4,4'-azobis-4-cyanovaleric diacid. After two hours of polymerisation, the conversion is greater than 99%, and the mean molar mass of the polymer in terms of number is 1680 g/mol, with an experimental polymolecularity index of 1.9.

This polymerisation complies with the four criteria a), b), c) and d) of the method according to the invention.

Test N° 13:

This example illustrates the invention and relates to the polymerisation of acrylic acid in the presence of compound A in methanol.

The operating conditions are similar to those described in Test N° 9. 408 mg of compound A is dissolved in 5.0 g of acrylic acid. 15 g of methanol (95% content in water) is added to the solution and, after degassing, 39 mg of 4,4'-azobis-4-cyanovaleric diacid. After two hours of polymerisation at 70° C., the conversion is greater than 95%, and the mean molar mass of the polymer in terms of number is 1880 g/mol, with an experimental polymolecularity index of 1.9.

This polymerisation complies with the four criteria a), b), c) and d) of the method according to the invention.

Test N° 14:

This example illustrates the invention and relates to the polymerisation of acrylic acid in the presence of compound A in water.

The operating conditions are similar to those described in Test N° 9. The radical polymerisation inhibitor is in this case Cupferron and the percentage by weight of acrylic acid in the solution is 44%. In 5.0 g of acrylic acid, 408 mg of compound A is dissolved. 5.8 g of water is added to the solution and, after degassing, 39 mg of 4,4'-azobis-4-cyanovaleric diacid. After ten minutes of polymerisation at 90° C., the conversion is greater than 99%, and the mean molar mass of the polymer in terms of number at the end of two hours is 3530 g/mol, with an experimental polymolecularity index of 1.9.

This polymerisation complies with the four criteria a), b), c) and d) of the method according to the invention.

Test N° 15

This example illustrates a field outside the invention and relates to the polymerisation of acrylic acid in the presence of compound B in ethanol.

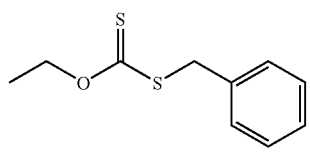

B

The operating conditions are similar to those described in Test N° 9. In 5.0 g of acrylic acid there is dissolved 220 mg of compound B. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is greater than 99%, and the mean molar mass of the polymer in terms of number is 5010 g/mol, with an experimental polymolecularity index of 3.4.

This polymerisation does not comply with criterion a) of the method according to the invention.

Test N° 16:

This example illustrates the invention and relates to the polymerisation of acrylic acid in the presence of compound C in ethanol.

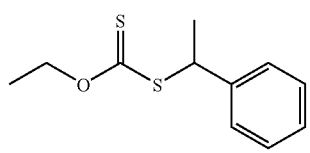

C

The operating conditions are similar to those described in Test N° 9. In 5.0 g of acrylic acid there is dissolved 314 mg of compound C. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is around 95%, and the mean molar mass by number of the polymer is 2740 g/mol, with an experimental polymolecularity index of 1.7.

This polymerisation complies with the four criteria a), b), c) and d) of the method according to the invention.

Test N° 17:

This example illustrates a field outside the invention and relates to the polymerisation of acrylic acid in the presence of compound D in ethanol.

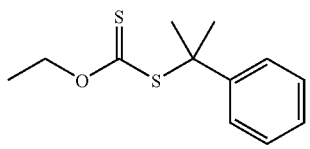

D

The operating conditions are similar to those described in Test N° 9. In 4.34 g of acrylic acid there is dissolved 290 mg of compound D. 13 g of absolute ethanol (Rectapur™ from Prolabo with the reference 20 820.327) is added to the solution and, after degassing, 34 mg of 4,4'-azobis-4-cyanovaleric diacid. After two hours of polymerisation, the conversion is less than 30%, and the mean molar mass by number of the polymer is 1840 g/mol, with an experimental polymolecularity index of 1.9.

This polymerisation does not comply with criterion b) of the method according to the invention.

Test N° 18:

This example illustrates the fifth criterion of the method of polymerising acrylic acid in the presence of compound D according to the invention.

Figure 5:
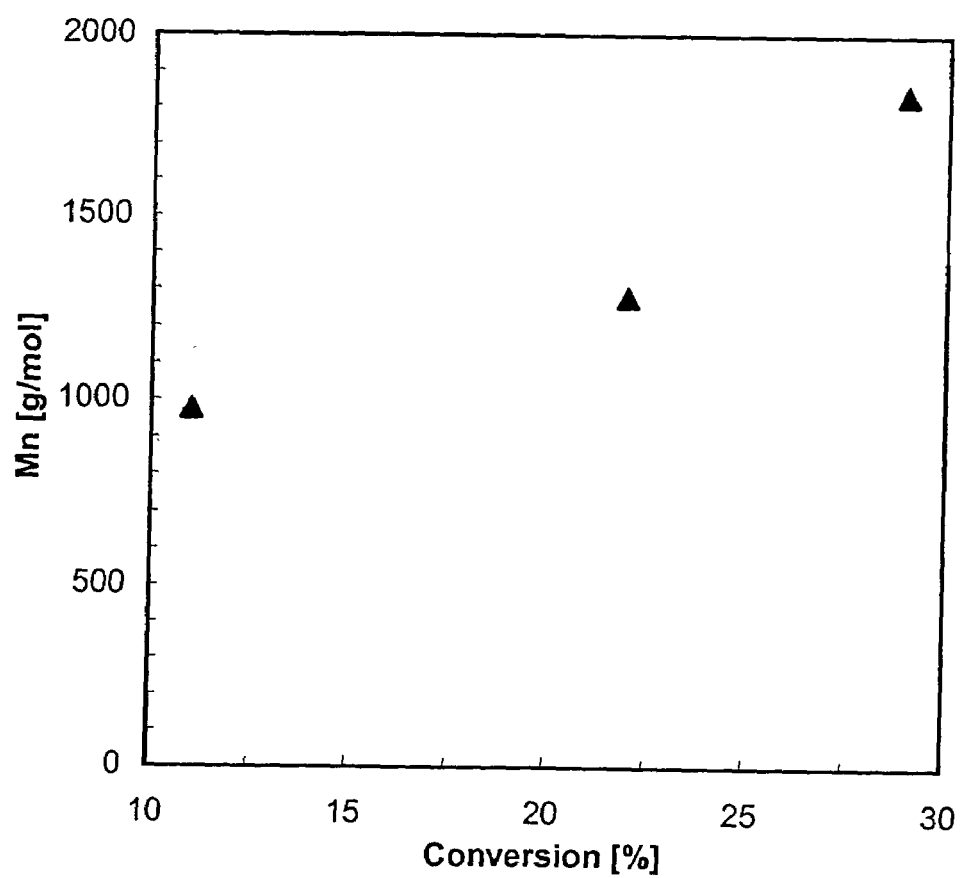
FIG. 5 is a graph showing change in the mean molecular mass $\overline{M_n}$ as a function of conversion.

The operating conditions are similar to those described in Test N° 9. This example shows that the molar mass changes linearly with the conversion (FIG. 5).

TABLE 3

Changes in the mean molar mass by number $\overline{M_n}$ and in the experimental polymolecularity index during the polymerisation carried out according to Test N° 17.

| Conversion [%] | $\overline{M_n}$ [g/mol] | $IP_{exp}$ |
|---|---|---|
| 11 | 975 | 2.0 |
| 22 | 1280 | 2.1 |
| 29 | 1840 | 1.9 |

FIG. 5 shows change in the mean molar mass by number $\overline{M_n}$ with the conversion into polyacrylic acid.

Test N° 19:

This example illustrates the invention and relates to the polymerisation of acrylic acid in the presence of compound E in water.

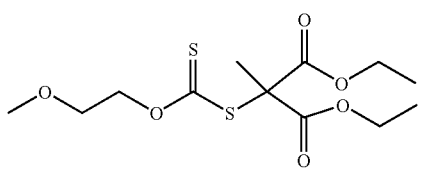

E

The operating conditions are similar to those described in Test N° 9. The radical polymerisation inhibitor is in this case Cupferron and the percentage by weight of acrylic acid in the solution is 40%. In 5.0 g of acrylic acid there is dissolved 450 mg of compound E.

7.0 g of water is added to the solution and, after degassing, 39 mg of 4,4'-azobis-4-cyanovaleric diacid. After ten minutes of polymerisation, the conversion is greater than 99%, and the mean molar mass by number of the polymer at the end of two hours is 3440 g/mol, with an experimental polymolecularity index of 1.8.

This polymerisation complies with the four criteria a), b), c) and d) of the method according to the invention.

Test N° 20:

This example illustrates the invention and relates to the polymerisation of acrylic acid in the presence of compound F in ethanol.

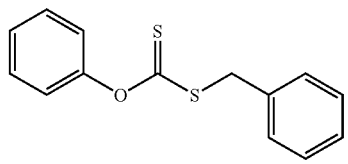

F

The operating conditions are similar to those described in Test N° 9. In 5.0 g of acrylic acid there is dissolved 362 mg of compound F. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is greater than 90%, and the mean molar mass by number of the polymer is 2400 g/mol, with an experimental polymolecularity index of 1.8.

This polymerisation complies with the four criteria a), b), c) and d) of the method according to the invention.

Test N° 21:

This example illustrates the invention and relates to the polymerisation of acrylic acid in the presence of compound G in ethanol.

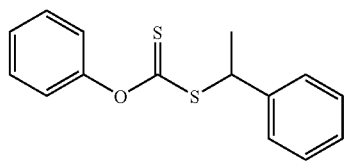

G

The operating conditions are similar to those described in Test N° 9. In 5.0 g of acrylic acid there is dissolved 381 mg of compound G. 15 g of absolute ethanol (Rectapur™ from Prolabo with the reference 20 820.327) is added to the solution and, after degassing, 39 mg of 4,4'-azobis-4-cyanovaleric diacid. After one and a half hours of polymerisation, the conversion is greater than 99%, and the mean molar mass by number of polymer is 4700 g/mol, with an experimental polymolecularity index of 1.4.

This polymerisation complies with the four criteria a), b), c) and d) of the method according to the invention.

Test N° 22:

This example illustrates the fifth criterion of the method of polymerising acrylic acid in the presence of compound G according to the invention.

The operating conditions are similar to those described in Test N° 21. The experiment is reproduced three times (A, B, C) (Table 4). This example shows that the molar mass increases monotonically with the conversion (FIGS. 6 and 7) and therefore illustrates the fifth criterion of the method according to the invention.

TABLE 4

Changes in the mean molar mass by number $\overline{M_n}$ and in the experimental polymolecularity index during the polymerisation carried out according to Test N° 21.

| Experiment | SEC reference | Conversion [%] | $\overline{M_n}$ [g/mol] | $IP_{exp}$ |
|---|---|---|---|---|
| B | 1 | 24 | 1750 | 1.4 |
| C | 2 | 39 | 2400 | 1.4 |
| A | — | 65 | 3500 | 1.4 |
| C | 3 | 66 | 3800 | 1.3 |
| B | — | 72 | 3500 | 1.3 |
| C | 4 | 79 | 4100 | 1.3 |
| A | — | 88 | 4100 | 1.4 |
| B | 5 | 100 | 4700 | 1.4 |

Figure 6:
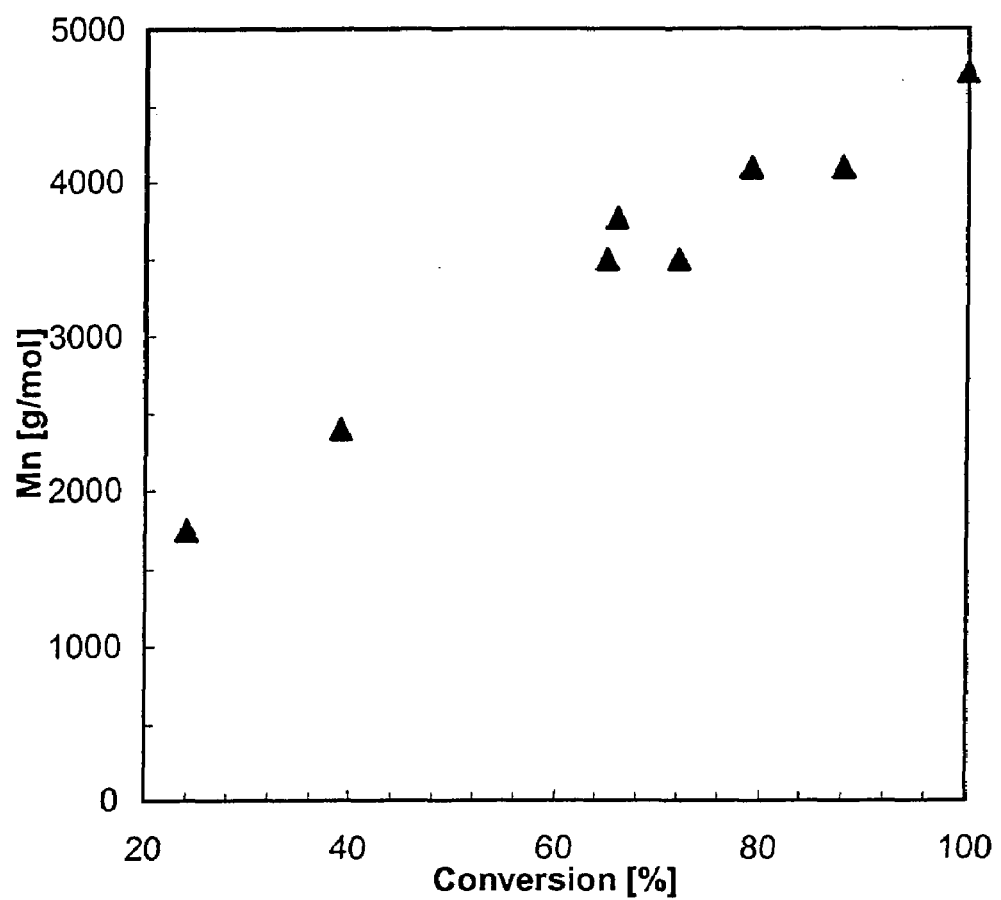
FIG. 6 is a graph showing change in the mean molecular mass $\overline{M_n}$ as a function of conversion.

FIG. 6 shows change in the mean molar mass by number $\overline{M_n}$ with the conversion into polyacrylic acid.

Figure 7:
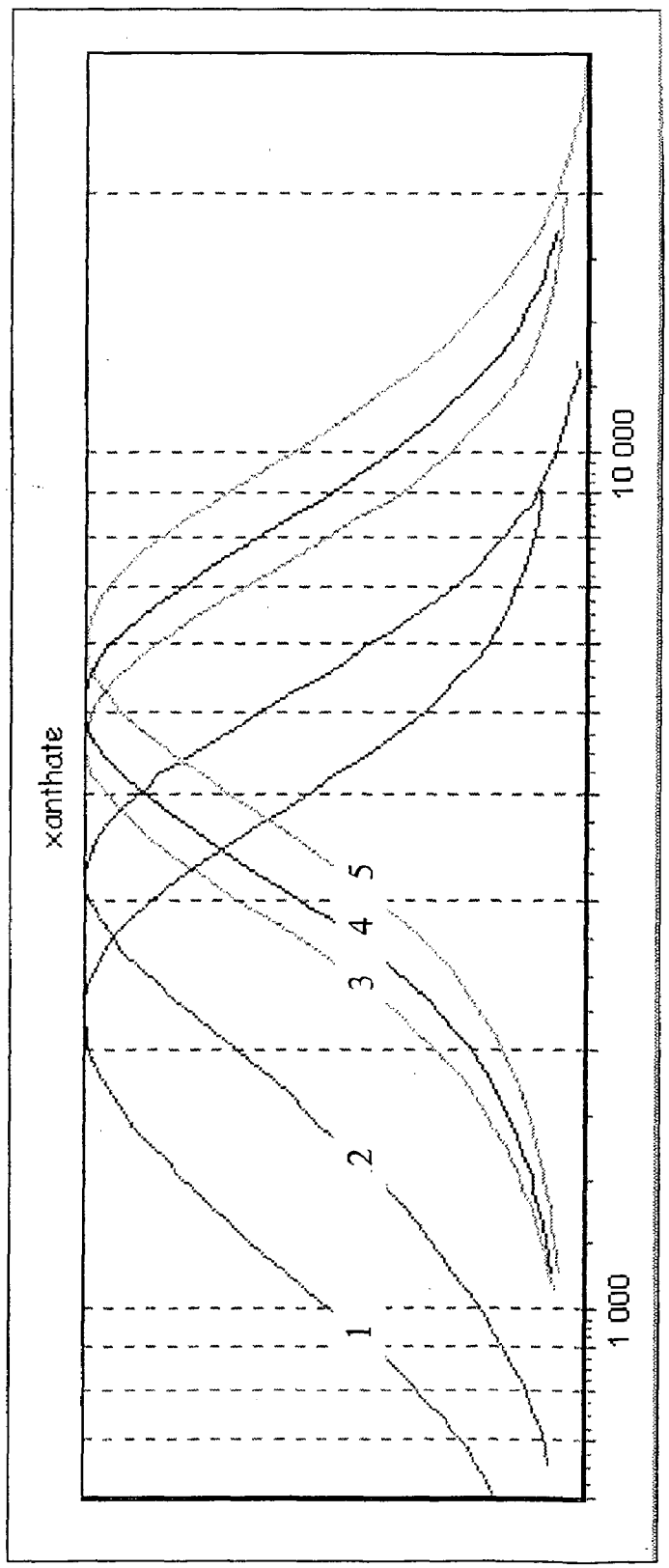
FIG. 7 is a graph showing change in SEC chromatograms as a function of conversion.

FIG. 7 shows change in the SEC chromatograms with the conversation into polyacrylic acid. The figures on each chromatogram refer to Table 4.

Test N° 23:

This example illustrates a field outside the invention and relates to the polymerisation of acrylic acid in the presence of compound H in ethanol.

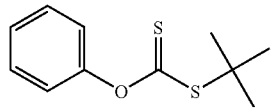

H

The operating conditions are similar to those described in Test N° 9. In 4.17 g of acrylic acid there is dissolved 258 mg of compound H. 12.3 g of absolute ethanol (Rectapur™ from Prolabo with the reference 20 820.327) is added to the solution and, after degassing, 32 mg of 4,4'-azobis-4-cyanovaleric diacid. After two hours of polymerisation, the conversion is greater than 99%, and the mean molar mass by number of the polymer is 3640 g/mol, with an experimental polymolecularity index of 2.35.

This polymerisation does not comply with criterion a) of the method according to the invention.

Test N° 24:

This example illustrates a field outside the invention and relates to the polymerisation of acrylic acid in the presence of compound I in ethanol.

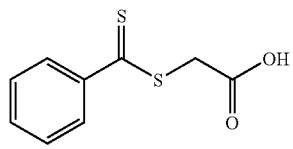

I

The operating conditions are similar to those described in Test N° 9. In 5.0 g of acrylic acid there is dissolved 294 mg of compound 1.15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is less than 10%. The mean molar mass by number is 2700 g/mol and the experimental polymolecularity index is 2.1.

This polymerisation does not comply with criteria a) and b) of the method according to the invention.

Test N° 25:

This example illustrates a field outside the invention and relates to the polymerisation of acrylic acid in the presence of compound J in ethanol.

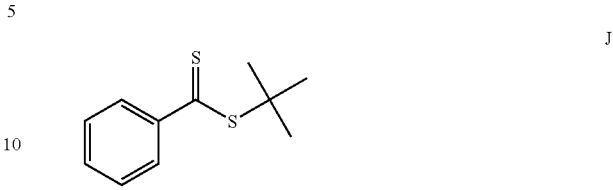

J

The operating conditions are similar to those described in Test N° 9. In 5.0 g of acrylic acid there is dissolved 292 mg of compound J. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is less than 20%, and the mean molar mass by number of the polymer is 930 g/mol, with an experimental polymolecularity index of 1.3.

This polymerisation does not comply with criterion b) of the method according to the invention.

Test N° 26:

This example illustrates a field outside the invention and relates to the polymerisation of acrylic acid in the presence of compound K in ethanol.

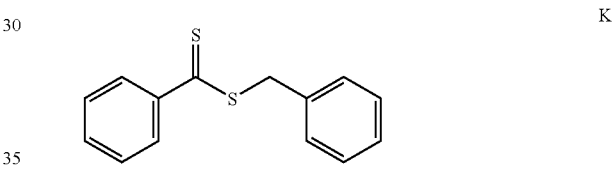

K

The operating conditions are similar to those described in Test N° 9. In 5.0 g of acrylic acid there is dissolved 339 mg of compound K. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is less than 15%, and the mean molar mass by number of the polymer is 980 g/mol, with an experimental polymolecularity index of 1.4.

This polymerisation does not comply with criterion b) of the method according to the invention.

Test N° 27:

This example illustrates a field outside the invention and relates to the polymerisation of acrylic acid in the presence of compound L in ethanol.

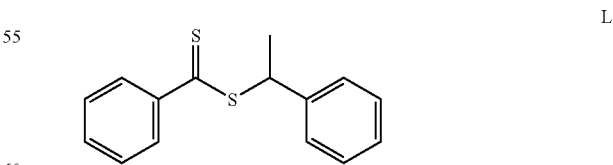

L

The operating conditions are similar to those described in Test N° 9. In 5.0 g of acrylic acid there is dissolved 359 mg of compound L. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation, the conversion is less than 30%, and the mean molar mass by number of the polymer is 980 g/mol, with an experimental polymolecularity index of 1.4.

This polymerisation does not comply with criterion b) of the method according to the invention.

Test N° 28:

This example illustrates a field outside the invention and relates to the polymerisation of acrylic acid in the presence of compound M in ethanol.

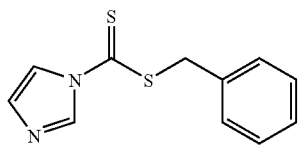

The operating conditions are similar to those described in Test N° 9. In 5.0 g of acrylic acid there is dissolved 325 mg of compound M. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation at reflux, the conversion is greater than 99%, and the mean molar mass by number of the polymer is 3900 g/mol, with an experimental polymolecularity index of 3.3. It is assumed that this compound degrades during polymerisation.

This polymerisation does not comply with criterion a) of the method according to the invention.

Test N° 29:

This example illustrates a field outside the invention and relates to the polymerisation of acrylic acid in the presence of compound O in ethanol.

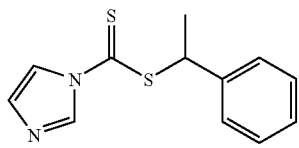

The operating conditions are similar to those described in Test N° 9. In 5.0 g of acrylic acid there is dissolved 345 mg of compound O. 15 g of absolute ethanol (Rectapur™ from Prolabo with the reference 20 820.327) is added to the solution and, after degassing, 39 mg of 4,4'-azobis-4-cyanovaleric diacid. After two hours of polymerisation at reflux, the conversion is 93%, and the mean molar mass by number of the polymer is 3800 g/mol, with an experimental polymolecularity index of 3.0. It is assumed that this compound also degrades during polymerisation.

This polymerisation does not comply with criterion a) of the method according to the invention.

Test N° 30:

This example illustrates the invention and relates to the polymerisation of acrylic acid in the presence of compound N in ethanol.

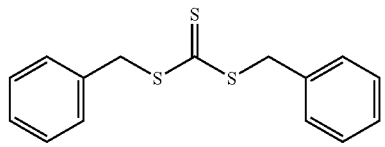

The operating conditions are similar to those described in Test N° 9. In a receptacle (1), 262 mg of compound N is dissolved in 3.3 g of acrylic acid (molar ratio AA:CTA=50:1). 9.8 g of absolute ethanol (Rectapur™ from Prolabo with the reference 20 820.327) is added to the solution and, after degassing, 25 mg of 4,4'-azobis-4-cyanovaleric diacid. After two hours of polymerisation, the conversion is greater than 99%, and the mean molar mass by number of the polymer is 1800 g/mol, with an experimental polymolecularity index of 1.4.

In a receptacle (2), 202 mg of compound N is dissolved in 5.0 g of acrylic acid (molar ratio AA:CTA=100:1). 15 g of absolute ethanol (Rectapur™ from Prolabo with the reference 20 820.327) is added to the solution and, after degassing, 19 mg of 4,4'-azobis-4-cyanovaleric diacid. After two hours of polymerisation, the conversion is greater than 99%, and the mean molar mass by number of the polymer is 2250 g/mol, with an experimental polymolecularity index of 1.5.

These polymerisations comply with the four criteria a), b), c) and d) of the method according to the invention.

Test N° 31:

This example illustrates the invention and relates to the polymerisation of acrylic acid in the presence of compound N in ethanol at 95% content in water.

The operating conditions are similar to those described in Test N° 9. In a receptacle, 6.04 g of compound N is dissolved in 150 g of acrylic acid (molar ratio AA:CTA=100:1). 450 g of ethanol (Vol RP Normapur™ from Prolabo with the reference 20 823.293) is added to the solution and, after degassing, 0.582 g of 4,4'-azobis-4-cyanovaleric diacid. After two hours of polymerisation, the conversion is equal to 98%, and the mean molar mass by number of the polymer is 3200 g/mol, with an experimental polymolecularity index of 1.56.

This polymerisation complies with the four criteria a), b), c) and d) of the method according to the invention.

Test N° 32:

This example illustrates the invention and relates to the polymerisation of acrylic acid in the presence of compound N in ethanol at 95% content in water.

The operating conditions are similar to those described in Test N° 9. In a receptacle, 4.03 g of compound N is dissolved in 150 g of acrylic acid (molar ratio AA:CTA=150:1). 450 g of ethanol (Vol RP Normapur™ from Prolabo with the reference 20 823.293) is added to the solution and, after degassing, 0.389 g of 4,4'-azobis-4-cyanovaleric diacid. After two hours of polymerisation, the conversion is equal to 96%, and the mean molar mass by number of the polymer is 4000 g/mol, with an experimental polymolecularity index of 1.65.

This polymerisation complies with the four criteria a), b), c) and d) of the method according to the invention.

Test N° 33:

This example illustrates the invention and relates to the polymerisation of acrylic acid in the presence of compound N in ethanol at 95% content in water.

The operating conditions are similar to those described in Test N° 9. In a receptacle, 3.02 g of compound N is dissolved in 150 g of acrylic acid (molar ratio AA:CTA=200:1). 450 g of ethanol (Vol RP Normapur™ from Prolabo with the reference 20 823.293) is added to the solution and, after degassing, 0.582 g of 4,4'-azobis-4-cyanovaleric diacid. After two hours of polymerisation, the conversion is equal to 95%, and the mean molar mass by number of the polymer is 4800 g/mol, with an experimental polymolecularity index of 1.65.

This polymerisation complies with the four criteria a), b), c) and d) of the method according to the invention.

Test N° 34:

This example illustrates the fifth criterion of the method of polymerising acrylic acid in the presence of compound N according to the invention.

The operating conditions are similar to those described in Test N° 30 (receptacle 1). This example shows that the molar mass changes proportionally with the conversion (FIG. 8) and illustrates criterion e) of the method according to the invention.

TABLE 5

Changes in the mean molar mass by number $\overline{M_n}$ and in the experimental polymolecularity index during the polymerisation carried out according to Test N° 30.

| Time [min] | Conversion [%] | $\overline{M_n}$ [g/mol] | $IP_{exp}$ |
|---|---|---|---|
| 10 | 7 | 840 | 1.3 |
| 20 | 40 | 1140 | 1.4 |
| 30 | 66 | 1445 | 1.4 |
| 60 | 91 | 1640 | 1.4 |
| 90 | 100 | 1780 | 1.4 |
| 120 | 100 | 1785 | 1.4 |

Figure 8:
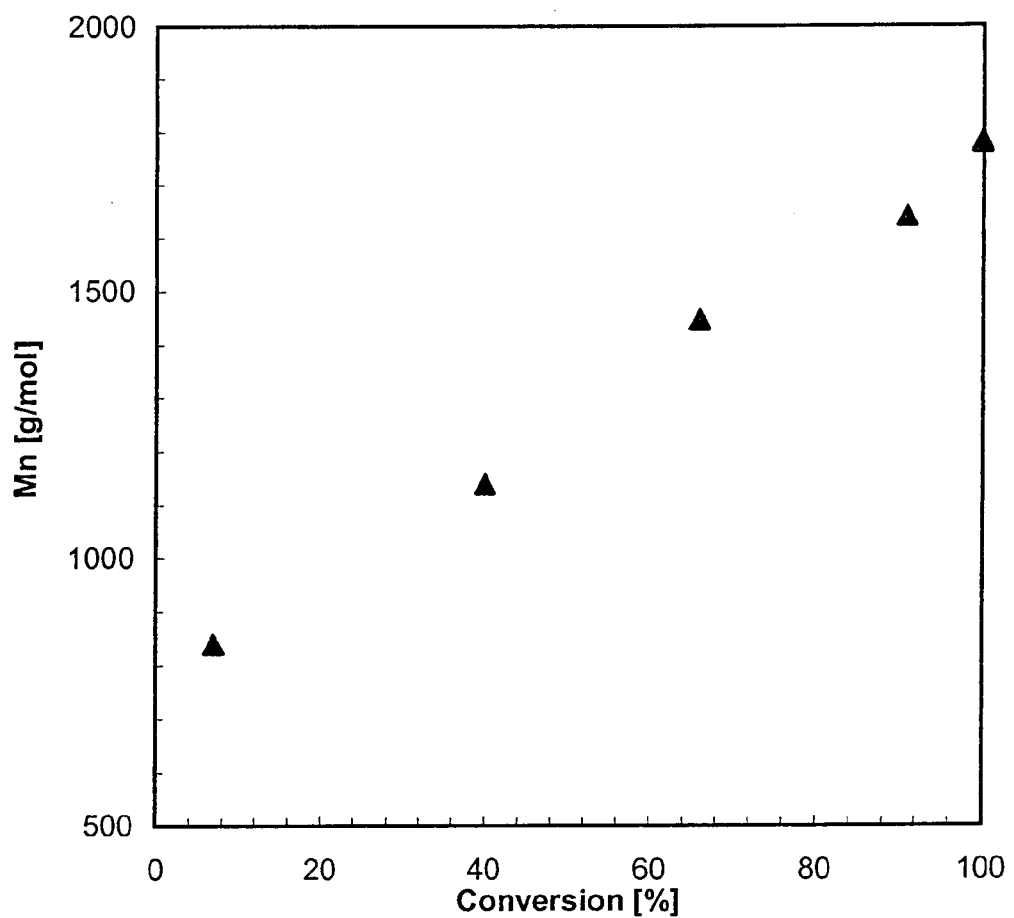
FIG. 8 is a graph showing change in the mean molecular mass $\overline{M_n}$ as a function of conversion.

FIG. 8 shows change in the mean molar mass by number $\overline{M_n}$ with the conversion into polyacrylic acid.

Test N° 35:

Next examples illustrates the invention and relates to the polymerisation of acrylic acid in the presence of compound P in ethanol.

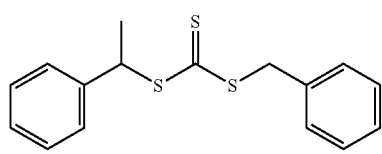

P

The operating conditions are similar to those described in Test N° 9. In 5.0 g of acrylic acid there is dissolved 221 mg of compound P (molar ratio AA:P=100:1). 15 g of absolute ethanol (Rectapur™ from Prolabo with reference 20 820.327) is added to the solution and, after degassing, 19 mg of 4,4'-azobis-4-cyanovaleric diacid. After two hours of polymerisation, the conversion is 96%, and the mean molar mass by number of the polymer is 2900 g/mol, with an experimental polymolecularity index of 1.5.

This polymerisation complies with the four criteria a), b), c) and d) of the method according to the invention.

Test N° 36:

This example illustrates the invention and relates to the polymerisation of acrylic acid in the presence of compound P in ethanol at 95% content in water.

The operating conditions are similar to those described in Test N° 9.

4.424 g of compound P is dissolved in 150 g of acrylic acid (molar ratio AA:P=150:1). 450 g of ethanol (Vol RP Normapur™ from Prolabo with the reference 20 823.293) is added to the solution and, after degassing, 0.389 g of 4,4'-azobis-4-cyanovaleric diacid. After two hours of polymerisation, the conversion is equal to 96%, and the mean molar mass by number of the polymer is 4200 g/mol, with an experimental polymolecularity index of 1.8.

This polymerisation complies with the four criteria a), b), c) and d) of the method according to the invention.

Test N° 37:

This example illustrates the invention and relates to the polymerisation of acrylic acid in the presence of compound P in ethanol at 95% content in water.

The operating conditions are similar to those described in Test N° 9.

3.31 g of compound P is dissolved in 150 g of acrylic acid (molar ratio AA:P=200:1). 450 g of ethanol (Vol RP Normapur™ from Prolabo with the reference 20 823.293) is added to the solution and, after degassing, 0.292 g of 4,4'-azobis-4-cyanovaleric diacid. After two hours of polymerisation, the conversion is equal to 93%, and the mean molar mass by number of the polymer is 5090 g/mol, with an experimental polymolecularity index of 1.7.

This polymerisation complies with the four criteria a), b), c) and d) of the method according to the invention.

Test N° 38:

This example illustrates the invention and relates to the polymerisation of acrylic acid in the presence of compound P in ethanol at 95% content in water.

The operating conditions are similar to those described in Test N° 9.

9.08 g of compound P is dissolved in 205.4 g of acrylic acid (molar ratio AA:P=100:1). 616 g of ethanol (Vol RP Normapur™ from Prolabo with the reference 20 823.293) is added to the solution and, after degassing, 0.798 g of 4,4'-azobis-4-cyanovaleric diacid. After two hours of polymerisation, the conversion is equal to 97%, and the mean molar mass by number of the polymer is 3200 g/mol, with an experimental polymolecularity index of 1.7.

This polymerisation complies with the four criteria a), b), c) and d) of the method according to the invention.

Test N° 39:

This example illustrates the invention and relates to the polymerisation of acrylic acid in the presence of compound P in ethanol at 95% content in water.

The operating conditions are similar to those described in Test N° 9.

3.0 g of compound P is dissolved in 37.8 g of acrylic acid (molar ratio AA:P=50:1). 112.5 g of ethanol (Vol RP Normapur™ from Prolabo with the reference 20 823.293) is added to the solution and, after degassing, 0.3 g of 4,4'-azobis-4-cyanovaleric diacid. After two hours of polymerisation, the conversion is equal to 99%, and the mean molar mass by number of the polymer is 2030 g/mol, with an experimental polymolecularity index of 1.63.

This polymerisation complies with the four criteria a), b), c) and d) of the method according to the invention.

Test N° 40:

This example illustrates the fifth criterion of the method of polymerising acrylic acid in the presence of compound P according to the invention.

The operating conditions are similar to those described in Test N° 32. This example shows that the molar mass changes proportionally with the conversion (FIG. 9) and illustrates the criterion e) of the method according to the invention.

TABLE 6

Changes in the mean molar mass by number $\overline{M_n}$ and in the experimental polymolecularity index during the polymerisation carried out according to Test N° 35.

| Time [min] | Conversion [%] | $\overline{M_n}$ [g/mol] | Ip$_{exp}$ |
|---|---|---|---|
| 20 | 16 | 700 | 1.5 |
| 30 | 45 | 1300 | 1.4 |
| 60 | 90 | 2500 | 1.4 |
| 90 | 96 | 2850 | 1.4 |
| 120 | 96 | 2900 | 1.5 |

Figure 9:
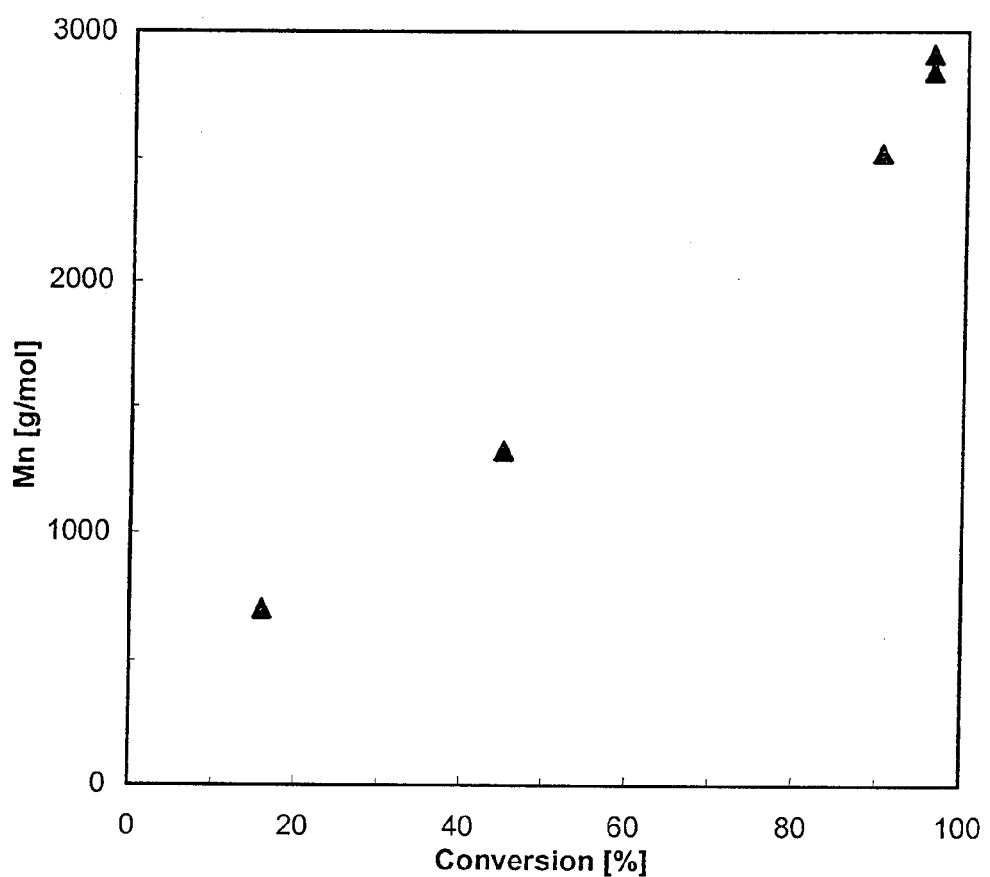
FIG. 9 is a graph showing change in the mean molecular mass $\overline{M_n}$ as a function of conversion.

FIG. 9 shows change in the mean molar mass by number $\overline{M_n}$ with the conversion into polyacrylic acid.

Test N° 41:

This example illustrates a field outside the invention and relates to the polymerisation of acrylic acid in the absence of any transfer agent.

5.0 g of acrylic acid is added to 15 g absolute ethanol (Rectapur™ from Prolabo with the reference 20 820.327). After degassing, 39 mg of 4,4'-azobis-4-cyanovaleric diacid is added. After ten minutes of polymerisation, the conversion is greater than 99%. The polymer, which is extremely viscous, forms a gel which dissolves partially in water. The mean molar mass by number of the polymer at the end of 2 hours is 33,100 g/mol, with an experimental polymolecularity index of 4.3 (presence of insolubles).

This polymerisation does not comply with criterion a) of the method according to the invention.

Test N° 42:

This example illustrates the invention and relates to the copolymerisation of acrylic acid with acrylamide in the presence of compound N.

To do it, in a glass receptacle, 33.8 g of acrylic acid, 3.75 g of acrylamide, 1.51 g of compound N and 0.15 g of 4,4'-azobis-4-cyanovaleric diacid are dissolved in 112.5 g of ethanol (Vol RP Normapur™ from Prolabo with the reference 20 823.293). After three hours of polymerisation at reflux, the conversion is equal to 94% for acrylic acid and 100% for acrylamide.

The mean molar mass by number of the polymer is 3000 g/mol, with an experimental polymolecularity index of 1.61.

This polymerisation complies with the four criteria a), b), c) and d) of the method according to the invention.

Test N° 43:

This example illustrates the invention and relates to the copolymerisation of acrylic acid with methacrylic acid in the presence of compound N.

To do it, in a glass receptacle, 33.8 g of acrylic acid, 4.54 g of methacrylic acid, 1.51 g of compound N and 0.15 g of 4,4'-azobis-4-cyanovaleric diacid are dissolved in 112.5 g of ethanol (Vol RP Normapur™ from Prolabo with the reference 20 823.293). After three hours of polymerisation at reflux, the conversion is equal to 100% for acrylic acid and methacrylic acid.

The mean molar mass by number of the polymer is 3300 g/mol, with an experimental polymolecularity index of 1.86.

This polymerisation complies with the four criteria a), b), c) and d) of the method according to the invention.

Test N° 44:

This example illustrates the invention and relates to the copolymerisation of acrylic acid with trimethylammonium ethyl methacrylate (MADQUAT) in the presence of compound N.

To do it, in a glass receptacle, 33.8 g of acrylic acid, 11.25 g of MADQUAT, 1.51 g of compound N and 0.15 g of 4,4'-azobis-4-cyanovaleric diacid are dissolved in 112.5 g of ethanol (Vol RP Normapur™ from Prolabo with the reference 20 823.293). After three hours of polymerisation at reflux, the conversion is equal to 95% for acrylic acid and 100% for MADQUAT.

The mean molar mass by number of the polymer is 3200 g/mol, with an experimental polymolecularity index of 1.7.

This polymerisation complies with the four criteria a), b), c) and d) of the method according to the invention.

Test N° 45:

This example illustrates the invention and relates to the copolymerisation of acrylic acid with acrylamido-methyl-propane sulfonic acid (AMPS) in the presence of compound N.

To do it, in a glass receptacle, 33.8 g of acrylic acid, 10.2 g of AMPS, 1.51 g of compound N and 0.15 g of 4,4'-azobis-4-cyanovaleric diacid are dissolved in 112.5 g of ethanol (Vol RP Normapur™ from Prolabo with the reference 20 823.293). After three hours of polymerisation at reflux, the conversion is equal to 99% for acrylic acid and 95% for AMPS.

The mean molar mass by number of the polymer is 3550 g/mol, with an experimental polymolecularity index of 1.66.

This polymerisation complies with the four criteria a), b), c) and d) of the method according to the invention.

EXAMPLE 3

This example illustrates the use of polymers obtained according to the invention as an agent assisting the grinding of mineral material and more particularly calcium carbonate.

This example also illustrates the obtaining of an aqueous suspension of calcium carbonate according to the invention.

It should also be noted that these calcium carbonate suspensions according to the invention are refined, have a high mineral material concentration and can easily be handled by the end user, that is to say can easily be used both for the coating of paper and for the mass filling of paper.

Test N° 46:

This test, which illustrates the invention, uses the polymer of Test N° 9.

Test N° 47:

This test, which illustrates the invention, uses the polymer of Test N° 30.

Test N° 48:

This test, which illustrates the invention, uses the polymer of Test N° 38.

Test N° 49:

This test, which illustrates the invention, uses the polymer of Test N° 36.

Test N° 50:

This test, which illustrates the invention, uses the polymer of Test N° 37.

Test N° 51:

This test, which illustrates the invention, uses a polymer identical to the one of Test N° 38 in terms of mean molar mass by number and in terms of polymolecularity index but is differentiated through the neutralisation effected 50% by the magnesium ion and 50% by the sodium ion instead of 100% neutralisation by the sodium ion, as is the polymer of Test N° 38.

For each test, an aqueous suspension was prepared from calcium carbonate coming from the Orgon (France) deposit, with a mean diameter of around 50 micrometres.

After an idle time of 8 hours in the flask, the viscosity of the suspension is measured by introducing the appropriate spindle of the Brookfield™ type RVT viscometer into the unstirred flask at a temperature of 20° C. and speeds of rotation of 10 revolutions per minute and 100 revolutions per minute (viscosity BEST=before stirring).

The same measurements of viscosity are also carried out once the flask has been stirred and constitute the AFST (after stirring) viscosity results.

All these experimental results are set out in Table 7 below, which in addition indicates the percentage consumption by weight of a grinding aid agent used to obtain the indicated granulometry:

| | GRINDING AID AGENT | | | | BROOKFIELD™ VISCOSITY OF THE SUSPENSION (at 20° C. in mPa · s) | | |
|---|---|---|---|---|---|---|---|
| TEST N° | Polymer Test N° | $M_n$ | Consumption of agent as % dry/dry | GRANULOMETRY (% particles < 1 µm) | T0 10 rpm-100 rpm | 8 days BEST 10 rpm-100 rpm | 8 days AFST 10 rpm-100 rpm |
| 46 | 9 | 2930 | 1.06 | 80 | 1968-691 | 26000-3760 | 6708-1776 |
| 47 | 30 | 2250 | 0.92 | 80 | 2585-870 | 29423-3858 | 6835-1795 |
| 48 | 38 | 3200 | 0.87 | 80 | 8414-2207 | 38863-10270 | 34078-9625 |
| 49 | 36 | 4200 | 0.96 | 80 | 7557-1921 | 47846-7093 | 29813-5231 |
| 50 | 37 | 5090 | 1.04 | 80 | 13070-3127 | 54117-6639 | 41260-6324 |
| 51 | 51 | 3200 | 1.23 | 80 | 3755-998 | 6024-1467 | 3209-862 |

BEST: Measurement of the viscosity before stirring of the suspension
AFST: Measurement of the viscosity after stirring of the suspension The aqueous suspension has a dry matter content of 76% by weight with respect to the total mass.

The grinding aid agent is introduced into this suspension in the quantities indicated in the following table, expressed as a percentage by dry weight with respect to the mass of dry calcium carbonate to be ground.

The suspension circulates in a grinder of the Dyno-Mill™ type with fixed cylinder and rotating impeller, where the grinding body consists of corundum balls with a diameter in the range 0.6 millimetres to 1.0 millimetre.

The total volume occupied by the grinding body is 1,150 cubic centimetres whilst its weight is 2900 g.

The grinding chamber has a volume of 1400 cubic centimetres.

The circumferential speed of the grinder is 10 metres per second.

The suspension of calcium carbonate is recycled at the rate of 18 litres per hour.

The outlet from the Dyno-Mill™ grinder is provided with a separator with a 200 micron mesh for separating the suspension resulting from the grinding and the grinding body.

The temperature during each grinding test is maintained at approximately 60° C.

At the end of the grinding ($T_o$), a sample of the pigmentary suspension is recovered in a flask. The granulometry of the suspension (% of particles less than 1 micrometre) is measured by means of a Sedigraph™ 5100 granulometer from Micromeritics.

The Brookfield™ viscosity of the suspension is measured by means of a Brookfield™ viscometer of the RVT type, at a temperature of 20° C. and rotation speeds of 10 revolutions per minute and 100 revolutions per minute with the appropriate spindle.

A reading of the results in Table 7 shows that it is possible to use the polymers according to the invention as an agent for assisting the grinding of mineral materials in aqueous suspension, and in particular natural calcium carbonate, as it is possible to obtain calcium carbonate aqueous suspension containing the polymer according to the invention.

EXAMPLE 4

This example relates to the demonstration of the use of polymers according to the invention as a dispersing agent for kaolin. This example also illustrates the obtaining of an aqueous suspension of kaolin according to the invention.

For this purpose, deflocculation curves are produced for the kaolin (SPS kaolin from Imerys) to be tested by introducing an increasing quantity of the agent to be tested into the aqueous suspension at 66% by dry weight of kaolin.

Test N° 52:

This test illustrates the invention and uses the polymer according to the invention of Test N° 30.

Test N° 53:

This test illustrates the invention and uses the polymer according to the invention of Test N° 9.

All the experimental Brookfield™ viscosity results at 10 rev/min and 100 rev/min according to the amount of polymer used, measured by means of a Brookfield™ viscometer type RVT, at a temperature of 20° C. and speeds of rotation of 10 revolutions per minute and 100 revolutions per minute with the appropriate spindle, are respectively set out in Tables 8 and 9 below:

TABLE 8

| Amount of dispersing agent (%) | Brookfield viscosities (mPa · s) | |
|---|---|---|
| | 10 rev/min | 100 rev/min |
| 0.15 | 2860 | 600 |
| 0.17 | 940 | 320 |
| 0.19 | 750 | 260 |
| 0.22 | 690 | 240 |
| 0.24 | 700 | 240 |
| 0.26 | 700 | 240 |
| 0.28 | 800 | 250 |
| 0.30 | 830 | 255 |
| 0.32 | 900 | 270 |
| 0.34 | 1020 | 290 |
| 0.36 | 1230 | 320 |

TABLE 9

| Amount of dispersing agent (%) | Brookfield viscosities (mPa · s) | |
|---|---|---|
| | 10 rev/min | 100 rev/min |
| 0.13 | 7400 | 1200 |
| 0.16 | 2100 | 690 |
| 0.19 | 1020 | 340 |
| 0.21 | 850 | 240 |
| 0.22 | 980 | 305 |
| 0.24 | 1000 | 305 |
| 0.27 | 1110 | 320 |
| 0.30 | 1210 | 345 |
| 0.33 | 1770 | 430 |

A reading of the results in Tables 8 and 9 shows that it is possible to use the polymers according to the invention as a dispersing or deflocculation agent for mineral materials in aqueous suspension, in particular kaolin.

EXAMPLE 5

This example relates to the demonstration of the use of the polymers according to the invention as a dispersing agent for precipitated calcium carbonate (PCC). This example also illustrates the obtaining of an aqueous suspension of PCC according to the invention.

For this purpose, deflocculation curves are produced for the PCC (Socal P3 from Solvay) to be tested by introducing increasing quantities of the agent to be tested into the aqueous suspension at 68% by dry weight of PCC.

Test N° 54:

This test illustrates the invention and uses the polymer according to the invention of Test N° 30.

Test N° 55:

This test illustrates the invention and uses the polymer according to the invention of Test N° 9.

All the experimental Brookfield™ viscosity results at 10 rev/min and 100 rev/min according to the amount of polymer used, measured by means of a Brookfield™ type RVT viscometer, at a temperature of 20° C. and speeds of rotation of 10 revolutions per minute and 100 revolutions per minute with the appropriate spindle, are respectively set out in Tables 10 and 11 below:

TABLE 10

| Amount of dispersing agent (%) | Brookfield viscosities (mPa · s) | |
|---|---|---|
| | 10 rev/min | 100 rev/min |
| 0.25 | 31500 | 7050 |
| 0.35 | 9640 | 1400 |
| 0.40 | 6000 | 950 |
| 0.45 | 5200 | 840 |
| 0.50 | 5040 | 810 |
| 0.55 | 3880 | 680 |
| 0.60 | 3700 | 640 |
| 0.65 | 3500 | 610 |
| 0.70 | 3200 | 580 |
| 0.75 | 3200 | 575 |
| 0.80 | 3100 | 550 |
| 0.85 | 3100 | 550 |
| 0.90 | 3100 | 575 |
| 0.95 | 3100 | 590 |
| 1.0 | 3200 | 600 |

TABLE 11

| Amount of dispersing agent (%) | Brookfield viscosities (mPa · s) | |
|---|---|---|
| | 10 rev/min | 100 rev/min |
| 0.25 | 20800 | 3200 |
| 0.30 | 13400 | 2340 |
| 0.35 | 5200 | 870 |
| 0.40 | 3700 | 660 |
| 0.45 | 3350 | 600 |
| 0.50 | 2880 | 540 |
| 0.55 | 2690 | 530 |
| 0.60 | 2600 | 530 |
| 0.65 | 2500 | 520 |
| 0.7 | 2600 | 550 |
| 0.75 | 2700 | 570 |
| 0.80 | 2800 | 590 |
| 0.85 | 2910 | 610 |
| 0.9 | 3040 | 620 |

A reading of the results in Tables 10 and 11 shows that it is possible to use the polymers according to the invention as a dispersing or deflocculation agent for mineral materials in aqueous suspension, and in particular precipitated calcium carbonate.

EXAMPLE 6

This example relates to the demonstration of the use of the polymers according to the invention as a dispersing agent for titanium dioxide. This example also illustrates the obtaining of an aqueous suspension of titanium dioxide according to the invention.

For this purpose, deflocculation curves are produced for the titanium dioxide (RHD2 from Elementis) to be tested by introducing increasing quantities of the agent to be tested into the aqueous suspension at 0.75% by dry weight of titanium dioxide.

Test N° 56:

This test illustrates the invention and uses the polymer according to the invention of Test N° 30.

Test N° 57:

This test illustrates the invention and uses the polymer according to the invention of Test N° 9.

All the experimental Brookfield™ viscosity results at 10 rev/min and 100 rev/min according to the amount of polymer used, measured by means of a Brookfield™ type RVT viscometer, at a temperature of 20° C. and speeds of rotation of 10 revolutions per minute and 100 revolutions per minute with the appropriate spindle, are respectively set out in Tables 12 and 13 below:

TABLE 12

| dry % of polymer | Brookfield viscosity (mPa · s) | |
|---|---|---|
| | 10 rev/min | 100 rev/min |
| 0.25 | 4400 | 630 |
| 0.3 | 1100 | 280 |
| 0.4 | 900 | 220 |
| 0.5 | 1300 | 280 |
| 0.6 | 1700 | 340 |
| 0.8 | 2400 | 430 |
| 1 | 3700 | 620 |

TABLE 13

| dry % of polymer | Brookfield viscosity (mPa · s) | |
|---|---|---|
| | 10 rev/min | 100 rev/min |
| 0.25 | 1300 | 300 |
| 0.3 | 500 | 170 |
| 0.4 | 800 | 200 |
| 0.5 | 1400 | 300 |
| 0.6 | 1900 | 360 |
| 0.8 | 2800 | 500 |
| 1 | 4700 | 840 |

A reading of the results in Tables 12 and 13 shows that it is possible to use the polymers according to the invention as a dispersing or deflocculation agent for mineral materials in aqueous suspension, and in particular titanium dioxide.

EXAMPLE 7

This example relates to the demonstration of the use of the polymers according to the invention as a dispersing agent for putting ground natural calcium carbonate in aqueous suspension without a dispersing agent at a granulometry in which 73% of the particles had a diameter of less than one micrometre determined by measurement with a Sedigraph 5100 from Micromeritics and resulting from a mechanical reconcentration of the centrifugation type following on from this grinding by wet method at a low concentration in dry matter and without a dispersing agent.

This natural calcium carbonate is a marble.

For each test, the aqueous suspension of marble was prepared by introducing, into the cake resulting from the centrifugation, 0.525% by dry weight of dispersing agent to be tested with respect to the dry weight of the said cake to be measured in suspension and 0.225% by weight of phosphoric acid so as to obtain an aqueous suspension of calcium carbonate at a dry matter concentration of 72%.

After 20 minutes of stirring, a sample of the suspension of calcium carbonate obtained is recovered in a flask and the Brookfield™ viscosity (Viscosity T=0) is measured by means of a Brookfield™ type RVT viscometer, at a temperature of 25° C. and at a speed of rotation of 10 revolutions and 100 revolutions per minute with the appropriate spindle.

After a time of 8 days in the flask, the Brookfield™ viscosity of the suspension is measured by introducing, into the unstirred flask, the appropriate spindle of the Brookfield™ type RVT viscometer, at a temperature of 25° C. and a speed of rotation of 10 and 100 revolutions per minute (BEST viscosity=Brookfield™ viscosity before stirring).

The flask is then strongly stirred and subjected to the determination of the Brookfield™ viscosity of the suspension at a temperature of 25° C. and at a speed of rotation of 10 and 100 revolutions per minute (AFST viscosity=Brookfield™ viscosity after stirring) using the appropriate spindle of the Brookfield™ type RVT viscometer.

The different polymers tested are:

Test N° 58:
For this test, which illustrates the invention, the polymer of Test N° 37.

Test N° 59:
For this test, which illustrates the invention, the polymer of Test N° 36.

Test N° 60:
For this test, which illustrates the invention, the polymer of Test N° 38.

Test N° 61:
For this test, which illustrates the invention, the polymer of Test N° 31.

Test N° 62:
For this test, which illustrates the invention, the polymer of Test N° 32.

Test N° 63:
For this test, which illustrates the invention, the polymer of Test N° 33.

All the experimental results are set out in Table 14 below.

| | Polymer | | BROOKFIELD VISCOSITY (mPa · s) | | | | | |
|---|---|---|---|---|---|---|---|---|
| | | | Viscosity T = 0 | | BEST | | AFST | |
| TEST N° | Test N° | $M_n$ | 10 t/min | 100 t/min | 10 t/min | 100 t/min | 10 t/min | 100 t/min |
| 58 | 37 | 5090 | 600 | 262 | 1210 | 471 | 560 | 253 |
| 59 | 36 | 4200 | 810 | 326 | 1170 | 416 | 700 | 263 |
| 60 | 38 | 3200 | 1180 | 367 | 1760 | 486 | 1910 | 429 |
| 61 | 31 | 3200 | 1410 | 420 | 950 | 527 | 1370 | 387 |
| 62 | 32 | 4000 | 940 | 336 | 1420 | 477 | 480 | 244 |
| 63 | 33 | 4800 | 580 | 294 | 540 | 475 | 470 | 247 |

BEST: Measurement of the viscosity before stirring of the suspension
AFST: Measurement of the viscosity after stirring of the suspension A reading of Table 14 shows that the polymers according to the invention can be used as a dispersing agent for natural calcium carbonate.

EXAMPLE 8

This example relates to the use of the polymers according to the invention in an interior matt water-based paint. For this purpose, an assessment is made of the dispersing efficacy of the polymers according to the invention contained in the aqueous suspensions of mineral materials according to the invention used in an indoor matt paint formulation.

Thus, for Tests N° 64 and 65, there is added, under stirring, 0.16% by dry weight of the dispersing agent tested, with respect to the total weight of the same matt water-based paint formulation, in a receptacle already containing 176.3 g of water and 1 g of 28% ammonia solution.

After a few seconds of stirring following the introduction of the polymer to be tested in the ammonia water, there are successively introduced the other constituents of the said matt water-based paint, which are:

2.3 g of a biocide sold by TROY under the name MER-GAL™ K6N 2.3 g of an antifoaming agent sold by TEGO under the name TEGO 1488

90 g of rutile titanium oxide sold by MILLENIUM under the name TIONA RL68

272 g of natural calcium carbonate sold by OMYA under the name DURCAL™ 5

223 g of natural calcium carbonate sold by OMYA under the name HYDROCARB™

130 g of a styrene-acrylic binder in dispersion sold by CLARIANT under the name MOWILITH LDM 1871

22 g of a thickener sold by COATEX under the name COAPUR™ 5535 qsp 1000 g with water.

The various tests are:

Test N° 64:

This test illustrates the invention and uses the polymer according to the invention of Test N° 30.

Test N° 65:

This test illustrates the invention and uses the polymer according to the invention of Test N° 9.

For each of these tests, after a few minutes of stirring of the aqueous composition thus produced, the Brookfield™ viscosities of the different compositions are measured at 25° C., at 10 revolutions per minute and 100 revolutions per minute using a Brookfield™ type RVT viscometer equipped with the appropriate spindle.

The rheological stability of the formulations over time and under temperature is determined by measuring the Brookfield™ viscosities of these formulations at 10 revolutions per minute and 100 revolutions per minute at 25° C. after storage without stirring for 24 hours, one week and one month at room temperature.

It is also determined by the ICI viscosity, which is the viscosity at a high shearing velocity gradient ($10,000\ s^{-1}$) measured by means of a flat cone viscometer.

The Stormer (KU) viscosity is also measured, expressed in Krebs Units determined by means of a Stormer viscometer.

All the results are set out in Table 15 below:

TABLE 15

| Test N° | | 64 | 65 |
|---|---|---|---|
| T = 24 hours | ICI (P) | 2.2 | 2.2 |
| Brookfield | 10 rev/min | 20400 | 19100 |
| viscosity (mPa · s) | 100 rev/min | 4300 | 4200 |
| Stormer viscosity (K.U) | | 116 | 115 |
| T = 1 week | ICI (P) | 2.2 | 2.2 |
| Brookfield | 10 rev/min | 18200 | 17300 |
| viscosity (mPa · s) | 100 rev/min | 4100 | 3900 |
| Stormer viscosity (K.U) | | 117 | 114 |
| T = 1 week 50° C. | ICI (P) | 2.2 | 2.1 |
| Brookfield | 10 rev/min | 20400 | 20100 |
| viscosity (mPa · s) | 100 rev/min | 4300 | 4000 |
| Stormer viscosity (K.U) | | 121 | 123 |
| T = 1 month | ICI (P) | 2.2 | 2.2 |
| Brookfield | 10 rev/min | 19100 | 18400 |
| viscosity (mPa · s) | 100 rev/min | 4200 | 3800 |
| Stormer viscosity (K.U) | | 118 | 115 |
| T = 1 month 50° C. | ICI (P) | 2.2 | 2.1 |
| Brookfield | 10 rev/min | 20800 | 20600 |
| viscosity (mPa · s) | 100 rev/min | 4200 | 4100 |
| Stormer viscosity (K.U) | | 123 | 126 |

A reading of Table 15 shows that the polymers according to the invention can be used in the field of paint.

EXAMPLE 9

This example relates to the use of the polymers according to the invention in the field of ceramics.

For this purpose, the dispersing effectiveness of the polymers according to the invention contained in the aqueous suspensions of clay according to the invention used in the field of ceramics is evaluated.

To do this and for each of Tests N° 66 to 68, 300 g of standard clay for slip is introduced into a 1 litre plastic beaker provided with a 60 mm diameter stirring blade. The clay introduced is turned into a paste with 122.5 g of water, thus corresponding to a dry matter concentration of 71%.

Then 0.20% by dry weight of the dispersing agent tested, with respect to the dry weight of clay, is added and then, after 10 minutes of stirring at a speed of 750 revolutions per minute, the viscosity of the slip is measured by measuring the flow time of the slip in a 100 ml pipette.

It should be noted that, for the reference test, the suspension is too viscous and measuring the viscosity is impossible.

After the measurement of this viscosity, 0.031% by dry weight of the polymer tested, with respect to the dry weight of clay, is introduced again into the beaker, and then after the 10 minutes of stirring at the same speed the viscosity of the slip obtained is measured, and so on for the successive additions of the polymer to be tested.

These additions correspond to the total doses, equal respectively to 0.25%, 0.275%, 0.312%, 0.347%.

The various tests are as follows:

Test N° 66:

This test is a reference and uses a conventional sodium polyacrylate obtained by a conventional polymerisation method.

Test N° 67:

This test illustrates the invention and uses the polymer according to the invention of Test N° 39.

Test N° 68:

This test illustrates the invention and uses the polymer according to the invention of Test N° 31.

All the experimental results are set out in Table 16 below.

TABLE 16

| | FLOW TIME IN THE PIPETTE | | |
|---|---|---|---|
| TEST N° | Standard 66 | Invention 67 | Invention 68 |
| 0.2 | — | 36 | 96 |
| 0.231 | 144.06 | 25 | 37.8 |
| 0.25 | 67.9 | 20.94 | 30.5 |
| 0.275 | 37.98 | 18.7 | 26.2 |
| 0.312 | 28.51 | 17.5 | 23.5 |
| 0.347 | 24.72 | 17.2 | 23.9 |

A reading of the results in Table 16 shows that the use of the polymers in the field of ceramics is possible and that the clay slips or suspensions according to the invention are better than those of the prior art.

EXAMPLE 10

This example relates to the use of an aqueous suspension of mineral filler according to the invention in the paper field.

It concerns more particularly the determination of the various Brookfield™ viscosity values of a 100% kaolin coating colour.

Test N° 69:

To do this, a coating colour is produced illustrating the invention by introducing, into a 500 ml beaker, 0.15% by dry weight, with respect to the dry weight of kaolin, of the polymer of Test N° 39 according to the invention and the quantity of water necessary for obtaining a final dry extract of 65%.

Stirring is next carried out for 2 minutes and then 500 g of powdery kaolin (SPS kaolin sold by Imerys) is added under stirring ensuring that there is a pH of around 8.6+0.2 by adjusting with 12.5% soda.

With the addition ended, the stirring is maintained for 15 minutes before the introduction of 12% by dry weight, with respect to the dry weight of kaolin, of a styrene-butadiene latex sold by DOW under the name DL 950.

After 10 minutes of stirring, the dry matter concentration of the slip obtained is adjusted to 65%.

The Brookfield™ viscosities are then determined at 10 and 100 revolutions per minute at 25° C. using a Brookfield™ type DV-1 viscometer equipped with the appropriate spindle, and have the values:

Brookfield™ viscosity 10 rev/min.=900 mPa.s
Brookfield™ viscosity 100 rev/min.=300 mPa.s.

A reading of these results shows that the rheological characteristics of the coating colour according to the invention make it possible to use the aqueous suspensions according to the invention in the papermaking field and in particular for the coating of paper.

The invention claimed is:

1. A method for the homopolymerisation of acrylic acid or of its salts, or copolymerisation of acrylic acid or of its salts with one or more water-soluble monomers, in solution, for obtaining non cross-linked polymers, comprising polymerizing acrylic acid and optionally one or more water-soluble monomers in the presence of a transfer agent or agents of the following formula:

R—X—C(S)—S—R' in which:

X=O or S,

R represents a group for stabilising the function R—X by a covalent bond of the C—X type, R' represents a group such that the R'—S bond is a bond of the C—S type, whereby reaction parameters and the transfer agent or agents are selected so that the following four criteria are simultaneously achieved:

a) an $IP_{exp}<2$ for molar masses $M_n$ greater than 1000 without physical or physico-chemical separation and determined according to the IP called method, and b) absence of gel on polymerisation at conversion rates greater than 90%, c) >90% conversion rate after 4 hours at 100° C. and at atmospheric pressure, and d) the amount of transfer agent or agents is between 0.001% to 20% (molar) and 0.01% to 50% (by weight).

2. A method according to claim 1, wherein the polymerisation is carried out in an aqueous or water-alcohol solvent system, and the alcohols have 1 to 4 carbon atoms inclusive, and are primary, secondary or tertiary alcohols.

3. A method according to claim 1, wherein in the formula of the transfer agent or agents, R is a group selected from the group consisting of aryl, alkyl and phenyl groups, which are optionally substituted by heterocyclic, alkylthio, alkoxycarbonyl, aryloxycarbonyl, carboxy, acyloxy, carbamoyl, cyano, dialkyl- or diaryl-phosphonato, dialkyl- or diarylphosphinato groups or carboxyls or carbonyls or ethers or alcohols or mixtures thereof, and R' is a group comprising at least one secondary or tertiary carbon atom bonded to the sulphur atom.

4. A method according to claim 1, wherein in the general formula of the transfer agent or agents, if X=O, R is an aryl or phenyl group or phenyl having one or more ester, ether, acid, alcohol, amine, sulphate, sulphonate, phosphate, phosphonate or ketone groups, R' is a group attached to the sulphur atom by a secondary or tertiary carbon, at least one of the substituents of which is a phenyl or carbonyl group, if X=S, then R=R' and R' is a group attached to the sulphur atom by a secondary or tertiary carbon, at least one of whose constituents is a phenyl or carbonyl group.

5. A method according to claim 1, wherein the transfer agent or agents are selected from the following compounds:

-continued

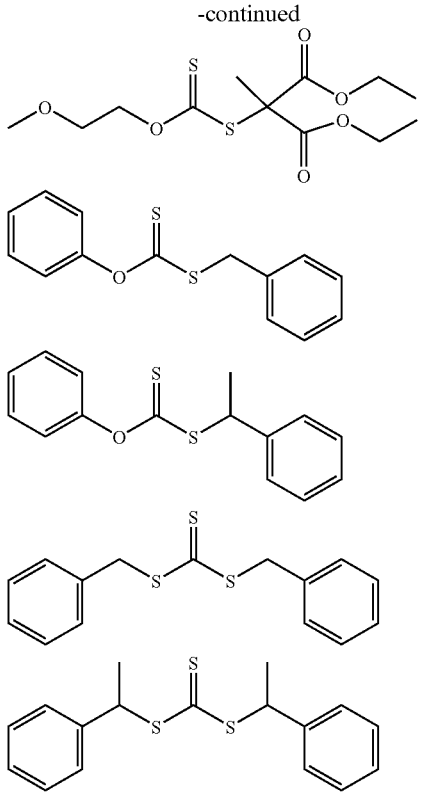

6. A method according to claim 1, wherein the transfer agent or agents are selected from the following compounds:

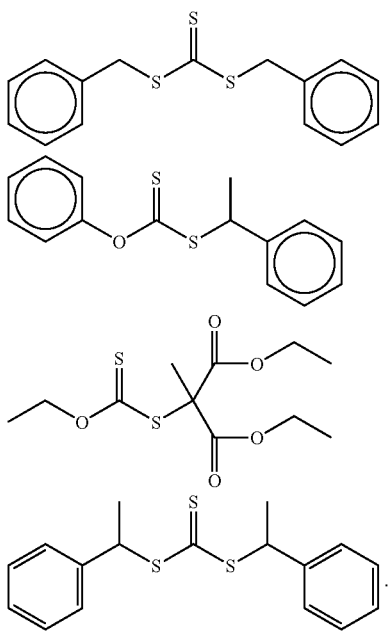

7. A method according to claim 1, further comprising a fifth criterion simultaneously achieved, wherein the fifth criterion is that the molar masses by number increase strictly monotonically when the advancement of the reaction increases.

8. A method according to claim 7, wherein the transfer agent or agents are selected from the following compounds:

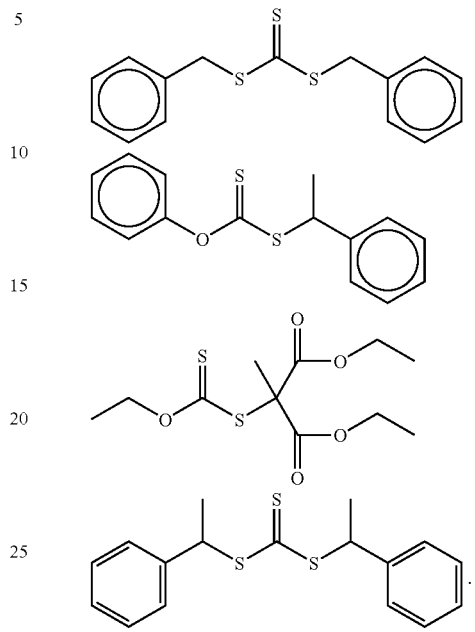

9. A method according to claim 1, wherein the molar masses $M_n$ of the acrylic acid homopolymer or copolymer obtained by the method are around 1000 to 1 million (1M) daltons.

10. A method according to claim 1, wherein a molar ratio of transfer agent or agents to the acrylic acid and the optional water-soluble monomer is between 0.001% and 20% and a ratio by weight of transfer agent to the acrylic acid and the optional water-soluble monomer is between 0.01 and 50%.

11. A method according to claim 10, wherein the molar ratio of transfer agent to the acrylic acid and the optional water-soluble monomer is between 0.01% and 10% and the ratio by weight of transfer agent to the acrylic acid and the optional water-soluble monomer is between 0.01 and 10%.

12. A method according to claim 11, wherein the molar ratio of transfer agent to the acrylic acid and the optional water-soluble monomer is between 0.1% and 5% and the ratio by weight of transfer agent to the acrylic acid and the optional water-soluble monomer is between 0.01 and 5%.

13. A method according to claim 8, wherein a molar ratio of transfer agent to the acrylic acid and the optional water-soluble monomer is 2% and a ratio by weight of transfer agent to the acrylic acid and the optional water-soluble monomer is between 0.01 and 5%.

14. A method according to claim 1, wherein copolymerisation is carried out, and the water-soluble copolymerised monomer or monomers are selected from the group consisting of methacrylic acid, itaconic, maleic or fumaric acid, 2-acrylamido-2-methyl-1-propane sulphonic acid in acidic or partially neutralised form, 2-methacrylamido-2-methyl-1-propane sulphonic acid in acidic or partially neutralised form, 3-methacrylamido-2-hydroxy-1-propane sulphonic acid in acidic or partially neutralised form, allylsulphonic acid, methallylsulphonic acid, allyloxybenzene sulphonic acid, methallyloxybenzene sulphonic acid, 2-hydroxy-3-(2-propenyloxy)propane sulphonic acid, 2-methyl-2-propene-1-sulphonic acid, ethylene sulphonic acid, propene sulphonic acid, 2-methyl sulphonic acid, styrene sulphonic acid as well as all their salts, vinyl sulphonic acid, sodium methallylsulphonate, sulphopropyl acrylate or methacrylate, sulphomethylacrylamide, sulphomethylmethacrylamide, acrylamide, methacrylamide, n-methylolacrylamide, n-acryloylmorphoprenumbered line, ethylene glycol methacrylate, ethylene glycol acrylate, propylene glycol methacrylate, propylene glycol acrylate, propene phosphonic acid, ethylene or propylene glycol acrylate or methacrylate phosphate, vinylpyrrolidone, methacrylamido propyl trimethyl ammonium chloride or sulphate, trimethyl ammonium ethyl chloride or sulphate methacrylate, as well as their acrylate and quaternised or not acrylamide homologues and/or ammonium dimethyldiallylchloride, and mixtures thereof.

15. The method according to claim 2, wherein the alcohols are primary or secondary.

16. A method according to claim 1, wherein the amount of transfer agent or agents is 0.01% to 10% (by weight).

17. A method according to claim 1, wherein the amount of transfer agent or agents is 0.01% to 5% (by weight).

18. The method according to claim 9, wherein the molar masses $M_n$ of the acrylic acid homopolymer or copolymer obtained by the method are about 2000 to 1M daltons.

19. The method according to claim 9, wherein the molar masses $M_n$ of the acrylic acid homopolymer or copolymer obtained by the method are about 2000 to 500,000 daltons.

20. The method according to claim 9, wherein the molar masses $M_n$ of the acrylic acid homopolymer or copolymer obtained by the method are about 2000 to 300,000 daltons.

21. The method according to claim 9, wherein the molar masses $M_n$ of the acrylic acid homopolymer or copolymer obtained by the method are about 2000 to 50,000 daltons.

22. The method according to claim 9, wherein the molar masses $M_n$ of the acrylic acid homopolymer or copolymer obtained by the method are about 2000 to 30,000 daltons.

23. The method according to claim 9, wherein the molar masses $M_n$ of the acrylic acid homopolymer or copolymer obtained by the method are about 2000 to 15,000 daltons.

24. A method according to claim 8, wherein a molar ratio of transfer agent to the acrylic acid and the optional water-soluble monomer is 2% and a ratio by weight of transfer agent to the acrylic acid and the optional water-soluble monomer is between 0.5% and 5%.

* * * * *